US010525984B2

(12) United States Patent
Seppelt et al.

(10) Patent No.: US 10,525,984 B2
(45) Date of Patent: *Jan. 7, 2020

(54) SYSTEMS AND METHODS FOR USING AN ATTENTION BUFFER TO IMPROVE RESOURCE ALLOCATION MANAGEMENT

(71) Applicant: Massachusetts Institute of Technology, Cambridge, MA (US)

(72) Inventors: Bobbie Danielle Seppelt, Brookline, MA (US); Joonbum Lee, Seattle, WA (US); Linda Sala Angell, Grosse Pointe Farms, MI (US); Bryan L. Reimer, Newton, MA (US); Bruce L. Mehler, Jamaica Plain, MA (US); Joseph F. Coughlin, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/682,198

(22) Filed: Aug. 21, 2017

(65) Prior Publication Data

US 2018/0072327 A1    Mar. 15, 2018

Related U.S. Application Data

(60) Provisional application No. 62/377,016, filed on Aug. 19, 2016.

(51) Int. Cl.
*B60W 50/14* (2012.01)
*G06N 20/00* (2019.01)
(Continued)

(52) U.S. Cl.
CPC ............ *B60W 50/14* (2013.01); *B60W 40/08* (2013.01); *G06N 20/00* (2019.01); *G06Q 40/08* (2013.01);
(Continued)

(58) Field of Classification Search
CPC ................. B60W 50/14; B60W 40/08; B60W 2040/0872; B60W 2540/00; G06N 99/005; G06Q 40/08
See application file for complete search history.

(56) References Cited

U.S. PATENT DOCUMENTS

| 5,465,079 A | 11/1995 | Bouchard et al. |
| 6,879,969 B2 | 4/2005 | Engstrom et al. |
| (Continued) | | |

FOREIGN PATENT DOCUMENTS

| EP | 1 512 584 A1 | 3/2005 |
| EP | 1 914 106 A2 | 4/2008 |
| (Continued) | | |

OTHER PUBLICATIONS

[No Author Listed] International Standard, ISO 15007-1:2014(E), Road vehicles—Measurement of driver visual behaviour with respect to transport information and control systems—Part 1: Definitions and parameters. International Organization for Standardization (ISO), ISO/TC 22/SC 39 Ergonomics, Nov. 1, 2014, 2nd Edition, 13 Pages.
(Continued)

*Primary Examiner* — Behrang Badii
*Assistant Examiner* — Daniel L Greene
(74) *Attorney, Agent, or Firm* — Nutter McClennen & Fish LLP

(57) ABSTRACT

Systems and methods for assessing resource allocation are provided. In some exemplary embodiments, the system uses an attention buffer to classify glances by a person and/or automated system, the buffer determining the impact the glances have on the person and/or automated system's situation awareness level. The attention buffer calculates on a continuous basis a buffer value that is representative of the situation awareness level for the person and/or automated system at a particular moment in time. The calculated buffer
(Continued)

values, referred to as moment-to-moment buffer values, among other names, can be used as data points, and/or they can also be used to direct action by the system and/or person to alter the situation awareness level of the person and/or automated system.

38 Claims, 6 Drawing Sheets

(51) Int. Cl.
  *B60W 40/08* (2012.01)
  *G06Q 40/08* (2012.01)
  *G06K 9/00* (2006.01)
  *H04L 29/08* (2006.01)
(52) U.S. Cl.
  CPC ............... *B60K 2370/149* (2019.05); *B60W 2040/0872* (2013.01); *B60W 2540/00* (2013.01); *G06K 9/00617* (2013.01); *G06K 9/00845* (2013.01); *H04L 67/12* (2013.01)

(56) References Cited

U.S. PATENT DOCUMENTS

| | | | |
|---|---|---|---|
| 6,882,906 B2 | 4/2005 | Geisler et al. | |
| 6,892,116 B2 | 5/2005 | Geisler et al. | |
| 6,950,027 B2 | 9/2005 | Banas | |
| 6,974,414 B2 | 12/2005 | Victor | |
| 6,995,663 B2 | 2/2006 | Geisler et al. | |
| 6,998,972 B2 | 2/2006 | Geisler et al. | |
| 7,394,393 B2 | 7/2008 | Zhang et al. | |
| 7,423,540 B2 | 9/2008 | Kisacanin | |
| 7,428,449 B2 | 9/2008 | Fehr et al. | |
| 7,444,311 B2 | 10/2008 | Engstrom et al. | |
| 7,455,405 B2 | 11/2008 | Victor et al. | |
| 7,460,940 B2 | 12/2008 | Larsson et al. | |
| 7,463,157 B2 | 12/2008 | Victor et al. | |
| 7,463,961 B2 | 12/2008 | Powers et al. | |
| 7,468,673 B2 | 12/2008 | Sultan et al. | |
| 7,532,958 B2 | 5/2009 | Powers et al. | |
| 7,639,148 B2 | 12/2009 | Victor | |
| 7,656,313 B2 | 2/2010 | Victor et al. | |
| 7,777,619 B2 | 8/2010 | Yopp et al. | |
| 7,880,621 B2 | 2/2011 | Kalik | |
| 7,894,953 B2 | 2/2011 | Geisler et al. | |
| 7,912,796 B2 | 3/2011 | Engstrom et al. | |
| 8,487,775 B2 | 7/2013 | Victor et al. | |
| 8,497,880 B2 | 7/2013 | Victor et al. | |
| 8,749,350 B2 | 6/2014 | Geisler et al. | |
| 8,994,522 B2 | 3/2015 | Tengler et al. | |
| 9,063,543 B2* | 6/2015 | An | G05D 1/0055 |
| 9,101,313 B2 | 8/2015 | Levin et al. | |
| 9,213,522 B2 | 12/2015 | Prakah-Asante et al. | |
| 9,251,704 B2 | 2/2016 | Tzirkel-Hancock et al. | |
| 9,376,018 B2 | 6/2016 | Aryal et al. | |
| 9,379,900 B2 | 6/2016 | Lemmey et al. | |
| 2002/0140562 A1 | 10/2002 | Gutta et al. | |
| 2003/0158758 A1* | 8/2003 | Kanazawa | G06Q 40/02 705/4 |
| 2004/0039611 A1* | 2/2004 | Hong | G06Q 40/08 705/4 |
| 2005/0073136 A1* | 4/2005 | Larsson | A61B 3/113 280/735 |
| 2007/0244606 A1 | 10/2007 | Zhang et al. | |
| 2007/0296601 A1 | 12/2007 | Sultan et al. | |
| 2008/0143504 A1 | 6/2008 | Martin Alvarez | |
| 2009/0189974 A1* | 7/2009 | Deering | G09G 3/02 348/46 |
| 2009/0326796 A1* | 12/2009 | Prokhorov | G08G 1/161 701/532 |
| 2010/0033333 A1* | 2/2010 | Victor | A61B 3/113 340/576 |
| 2010/0102988 A1 | 4/2010 | Chen | |
| 2011/0276628 A1 | 11/2011 | Pell | |
| 2012/0323479 A1* | 12/2012 | Nagata | B60Q 9/008 701/301 |
| 2013/0325923 A1 | 12/2013 | Jin | |
| 2014/0204193 A1 | 7/2014 | Zhang et al. | |
| 2014/0347458 A1 | 11/2014 | Tijerina et al. | |
| 2015/0106289 A1* | 4/2015 | Basir | B60W 40/09 705/325 |
| 2015/0141043 A1* | 5/2015 | Abramson | G01C 21/34 455/456.1 |
| 2015/0258996 A1 | 9/2015 | Victor et al. | |
| 2015/0262484 A1 | 9/2015 | Victor et al. | |
| 2015/0312404 A1* | 10/2015 | Abramson | H04W 4/027 455/418 |
| 2017/0034726 A1 | 2/2017 | Broomhall et al. | |
| 2017/0088165 A1 | 3/2017 | Raphael et al. | |
| 2017/0309092 A1* | 10/2017 | Rosenbaum | G07C 5/008 |
| 2018/0053103 A1 | 2/2018 | Delgado et al. | |

FOREIGN PATENT DOCUMENTS

| | | |
|---|---|---|
| JP | 2002331850 A * | 11/2002 |
| WO | 01/018723 A2 | 3/2001 |
| WO | 2008/018991 A3 | 10/2008 |

OTHER PUBLICATIONS

[No Author Listed] Technical Specification, ISO/TS 15007-2:2014(E), Road vehicles—Measurement of driver visual behaviour with respect to transport information and control systems—Part 2: Equipment and procedures. International Organization for Standardization (ISO), ISO/TC 22/SC 39 Ergonomics, Sep. 1, 2014, 2nd Edition, 14 Pages.

[No Author Listed] International Standard, ISO 17488:2016(E), Road vehicles—Transport information and control systems—Detection-response task (DRT) for assessing attentional effects of cognitive load in driving. International Organization for Standardization (ISO), ISO/TC 22/SC 39 Ergonomics, Oct. 1, 2016, 1st Edition, 76 Pages.

[No Author Listed] NHTSA. Early Estimate of Motor Vehicle Traffic Fatalities for the First Nine Months (Jan.-Sep.) of 2015. U.S. Department of Transportation, National Highway Traffic Safety Administration (NHTSA), DOT HS 812 240, Jan. 2016, 3 Pages.

Ahlstrom, C., et al., Considerations when calculating percent road centre from eye movement data in driver distraction monitoring. Proceedings of the Fifth International Driving Symposium on Human Factors in Driver Assessment, Training and Vehicle Design, Jun. 22-25, 2009, Big Sky, Montana. Iowa City, IA: Public Policy Center, University of Iowa, 2009: 132-139.

Ahlstrom, C., et al., A Gaze-Based Driver Distraction Warning System and Its Effect on Visual Behavior. IEEE Transactions on Intelligent Transportation Systems, Jun. 2013;14(2):965-973.

Altmann, E.M., et al., Episodic Indexing: A Model of Memory for Attention Events. Cognitive Science, 1999;23(2)117-156.

Altmann, E.M., et al., Memory for goals: an activation-based model. Cognitive Science, Jan.-Feb. 2002;26(1):39-83.

Angell, L., et al., Driver Workload Metrics Project: Task 2 Final Report. U.S. Department of Transportation, National Highway Traffic Safety Administration, Nov. 2006, Report No. DOT HS 810 635, 460 pages.

Angell, L.S., Effects of Secondary Task Demands on Drivers' Responses to Events During Driving: Surrogate Methods and Issues. Proceedings of the Fourth International Driving Symposium on Human Factors in Driver Assessment, Training and Vehicle Design, Jul. 9-12, 2007, Stevenson, Washington, pp. 23-24, Abstract.

Angell, L., et al., Identification of Cognitive Load in Naturalistic Driving. National Surface Transportation Safety Center for Excellence, Report #15-UT-037, submitted Jul. 28, 2015, 99 pages.

Anstis, S.M., A chart demonstrating variations in acuity with retinal position. Letter to the Editors. Vision Res. Jul. 1974;14(7):589-92.

Arroyo, E., et al., CarCoach: a polite and effective driving coach. Conference on Human Factors in Computing Systems (CHI 2006), Apr. 22-27, 2006, Montréal, Québec, Canada, pp. 357-362.

(56) References Cited

OTHER PUBLICATIONS

Bellenkes, A.H., et al., Visual scanning and pilot expertise: the role of attentional flexibility and mental model development. Aviat Space Environ Med. Jul. 1997;68(7):569-79.
Biederman, I., et al., Scene perception: Detecting and judging objects undergoing relational violations. Cognitive Psychology, Apr. 1982, vol. 14, issue 2, pp. 143-177.
Birrell, S.A., et al., Glance behaviours when using an in-vehicle smart driving aid: A real-world, on-road driving study. Transportation Research Part F: Traffic Psychology and Behaviour, Jan. 2014, vol. 22, pp. 113-125.
Bonomi, F., The Smart and Connected Vehicle and the Internet of Things. Cisco Systems, Advanced Architecture and Research, Workshop on Synchronization and Timing Systems 2013 (WSTS 2013), San Jose, CA, 2013, 53 Pages, PowerPoint Presentation.
Botvinick, M.M., Hierarchical models of behavior and prefrontal function. Trends Cogn Sci. May 2008;12(5):201-8. doi: 10.1016/j.tics.2008.02.009. Epub Apr. 15, 2008.
Chun, M.M., et al., Contextual cueing: Implicit learning and memory of visual context guides spatial attention. Cognitive Psychology, Jun. 1998, vol. 36, issue 1, pp. 28-71.
Cohen, J.D., et al., A systems-level perspective on attention and cognitive control: Guided activation, adaptive gating, conflict monitoring, and exploitation vs. exploration. Cognitive Neuroscience of Attention, M.I. Posner (ed.), Guilford Publications, New York, NY, 2004, Chapter 6, pp. 71-90.
Crisler, M.C., et al., Effect of Wireless Communication and Entertainment Devices on Simulated Driving Performance. Transportation Research Record: Journal of the Transportation Research Board, Issue No. 2069, Transportation Research Board of the National Academies, Washington, D.C., 2008, pp. 48-54.
Crundall, D., et al., Effects of experience and processing demands on visual information acquisition in drivers. Ergonomics, 1998;41(4):448-458.
Crundall, D., et al., Eye movements and hazard perception in police pursuit and emergency response driving. J Exp Psycho Appl. Sep. 2003;9(3):163-74.
Dingus, T.A., et al., Attentional demand requirements of an automobile moving-map navigation system. Transportation Research Part A: General, Jul. 1989;23A(4):301-315.
Dingus, T.A., et al., The 100-Car Naturalistic Driving Study, Phase II—Results of the 100-Car Field Experiment. U.S. Department of Transportation, National Highway Traffic Safety Administration, DOT HS 810 593, Apr. 2006, 856 pages.
Dong, Y., et al., Driver Inattention Monitoring System for Intelligent Vehicles: A Review. IEEE Transactions on Intelligent Transportation Systems, Jun. 2011;12(2):596-614.
Donmez, B., et al., Safety implications of providing real-time feedback to distracted drivers. Accident Analysis & Prevention, May 2007;39(3):581-590.
Donmez, B., et al., Mitigating driver distraction with retrospective and concurrent feedback. Accid Anal Prev. Mar. 2008;40(2):776-86. doi: 10.1016/j.aap.2007.09.023. Epub Oct. 11, 2007.
Drews, F.A., et al., Text messaging during simulated driving. Hum Factors. Oct. 2009;51(5):762-70.
Durso, F.T., et al., Situation awareness. In: Handbook of Applied Cognition, F.T. Durso, et al., eds., John Wiley & Sons Ltd., New York, NY, 1999, Chapter 10, pp. 283-314.
Endsley, M.R., Toward a Theory of Situation Awareness in Dynamic Systems. Human Factors, Mar. 1995;37(1)32-64.
Engström, J., et al., Effects of visual and cognitive load in real and simulated motorway driving. Transportation Research Part F: Traffic Psychology and Behaviour, Mar. 2005;8(2):97-120.
Engström, J., et al., Attention selection and multitasking in everyday driving: A conceptual model. Driver Distraction and Inattention: Advances in Research and Countermeasures, 2013, Chapter 3, pp. 27-54.
Falkmer, T., et al., A comparison of eye movement behavior of inexperienced and experienced drivers in real traffic environments. Optom Vis Sci. Aug. 2005;82(8):732-9.
Fitch, G.M., et al., Analysis of Lane-Change Crashes and Near-Crashes. U.S. Department of Transportation, National Highway Traffic Safety Administration, DOT HS 811 147, Jun. 2009, 88 Pages.
Fitch, G.M., et al., Driver braking performance to surprise and expected events. Proceedings of the Human Factors and Ergonomics Society 54th Annual Meeting, 2010, vol. 54, issue 24, pp. 2076-2080.
Fletcher, L., et al., Driver state monitoring to mitigate distraction. Distracted Driving, I.J. Faulks, et al., eds., Sydney, New South Wales, Australia, Australasian College of Road Safety, 2007, pp. 487-524.
Fletcher, L., et al., Driver Inattention Detection based on Eye Gaze—Road Event Correlation. The International Journal of Robotics Research, Jun. 2009;26(6):774-801.
Franconeri, S.L., et al., Moving and looming stimuli capture attention. Percept Psychophys. Oct. 2003;65(7):999-1010.
Fridman, L., et al., A Framework for Robust Driver Gaze Classification. SAE International, SAE Technical Paper 2016-01-1426, SAE 2016 World Congress and Exhibition, Apr. 5, 2016, 8 Pages.
Fridman, L., et al., Driver Gaze Region Estimation without Use of Eye Movement. IEEE Intelligent Systems, vol. 31, Issue 3, pp. 49-56, 2016.
Fridman, L., et al., What can be predicted from six seconds of driver glances? Proceedings of the 2017 CHI Conference on Human Factors in Computing Systems (CHI '17), May 6-11, 2017, Denver, Colorado, USA, pp. 2805-2813.
Friedman, A., Framing pictures: The role of knowledge in automatized encoding and memory for gist. Journal of Experimental Psychology: General, 1979;108(3):316-355.
Glaser, Y.G., et al., Relationship Between Driver Eyes-Off-Road Interval and Hazard Detection Performance Under Automated Driving. SAE International, SAE Technical Paper 2016-01-1424, Apr. 5, 2016, 5 pages, doi:10.4271/2016-01-1424.
Green, M., "How long does it take to stop?" Methodological Analysis of Driver Perception-Brake Times. Transportation Human Factors, 2000;2(3):195-216.
Greene, M.R., et al., The briefest of glances: The time course of natural scene understanding. Research article. Psychological Science, 2009;20(4):464-472.
Hafed, Z.M., et al., Microsaccades as an overt measure of covert attention shifts. Vision Res. Oct. 2002;42(22):2533-45.
Hallmark, S., et al., Initial Analyses from the SHRP 2 Naturalistic Driving Study: Addressing Driver Performance and Behavior in Traffic Safety. National Academy of Sciences, The National Academies of Sciences, Engineering, and Medicine, The National Academies Press, SHRP 2 Safety Project S08, Transportation Research Board, Washington, D.C., 2013, 35 Pages.
Hancock, P.A., et al., On the philosophical foundations of the distracted driver and driving distraction. Driver Distraction: Theory, Effects, and Mitigation, M.A. Regan, et al., eds., CRC Press, Taylor & Francis Group, 2009, chapter 2, pp. 11-30.
Harbluk, J.L., et al., An on-road assessment of cognitive distraction: Impacts on drivers' visual behavior and braking performance. Accid Anal Prev, Mar. 2007;39(2):372-9. Epub Oct. 19, 2006.
Henderson, S.G., Input model uncertainty: Why do we care and what should we do about it? Proceeding of the 35th Conference on Winter Simulation: Driving Innovation (WSC '03), New Orleans, Louisiana, Dec. 7-10, 2003, pp. 90-100.
Hickman, J.S, et al., Distraction in Commercial Trucks and Buses: Assessing Prevalence and Risk in Conjunction with Crashes and Near-Crashes. U.S. Department of Transportation, Federal Motor Carrier Safety Administration, Sep. 2010, Report No. FMCSA-RRR-10-049, 79 Pages.
Hickman, J.S, et al., An assessment of commercial motor vehicle driver distraction using naturalistic driving data. Traffic Inj Prev. 2012;13(6):612-9. doi: 10.1080/15389588.2012.683841.
Hills, B.L., Vision, visibility, and perception in driving. Perception. 1980;9(2):183-216.
Hooge, I.T.C., et al., Control of fixation duration in a simple search task. Percept Psychophys. Oct. 1996;58(7):969-76.

(56) References Cited

OTHER PUBLICATIONS

Hooge, I.T.C., et al., Saccadic Search: On the Duration of a Fixation. In: Eye Movements: A Window on Mind and Brain, R.P.G. van Gompel, et al., eds., Elsevier Ltd., Oxford, UK, 2007, Chapter 27, pp. 581-595.

Horrey, W.J., et al., Driving and side task performance: the effects of display clutter, separation, and modality. Hum Factors. 2004 Winter;46(4):611-24.

Horrey, W.J., et al., Assessing the awareness of performance decrements in distracted drivers. Accid Anal Prev. Mar. 2008;40(2):675-82. doi: 10.1016/j.aap.2007.09.004. Epub Oct. 2, 2007.

Horswill, M.S., et al., Drivers' hazard perception ability: Situation awareness on the road. In S. Banbury, et al., eds.,. A Cognitive Approach to Situation Awareness, 2004, Chapter 9, pp. 155-175,. Aldershot, UK: Ashgate.

Hosking, S.G., et al., The effects of text messaging on young drivers. Hum Factors. Aug. 2009;51(4):582-92.

Howes, A., et al., Learning Consistent, Interactive, and Meaningful Task-Action Mappings: A Computational Model. Cognitive Science, 1996;20:301-356.

Hunt, A.R., et al., Covert and overt voluntary attention: linked or independent? Brain Res Cogn Brain Res. Dec. 2003;18(1):102-5.

International Search Report and Written Opinion for Application No. PCT/US2017/047841, dated Dec. 19, 2017 (11 Pages).

Kircher, K., et al., Issues related to the driver distraction detection algorithm AttenD. First International Conference on Driver Distraction and Inattention (DDI 2009), Sep. 28-29, 2009, Gothenburg, Sweden, 15 pages.

Kircher, K., et al., The impact of tunnel design and lighting on the performance of attentive and visually distracted drivers. Accident Analysis and Prevention. 2012, vol. 47, pp. 153-161.

Klauer, S.G., et al., The Impact of Driver Inattention on Near-Crash/ Crash Risk: An Analysis Using the 100-Car Naturalistic Driving Study Data. U.S. Department of Transportation, National Highway Traffic Safety Administration (NHTSA), DOT HS 810 594, Apr. 2006, 224 Pages.

Klauer, S.G., et al., Comparing Real-World Behaviors of Drivers With High versus Low Rates of Crashes and Near-Crashes. U.S. Department of Transportation, National Highway Traffic Safety Administration (NHTSA), DOT HS 811 091, Feb. 2009, 204 Pages.

Klauer, S.G., et al., An Analysis of Driver Inattention Using a Case-Crossover Approach on 100-Car Data: Final Report. U.S. Department of Transportation, National Highway Traffic Safety Administration (NHTSA), DOT HS 811 334, May 2010, 148 Pages.

Knipling, R.R., Naturalistic Driving Events: No Harm, No Foul, No Validity. Proceedings of the Eighth International Driving Symposium on Human Factors in Driver Assessment, Training and Vehicle Design, Jun. 22-25, 2015, Salt Lake City, Utah, pp. 197-203.

Lamble, D., et al., Detection thresholds in car following situations and peripheral vision: implications for positioning of visually demanding in-car displays. Ergonomics, 1999;42(6):807-815.

Lamme, V.A.F., et al., The distinct modes of vision offered by feedforward and recurrent processing. Trends Neurosci. Nov. 2000;23(11):571-9.

Land, M., et al., Which parts of the road guide steering? Nature. Sep. 28, 1995;377(6547):339-40.

Lansdown, T.C., Causes, measures, and effects of driver visual workload. In Stress, Workload, and Fatigue, P.A. Hancock, et al., eds., Lawrence Erlbaum Associates, Inc., Publishers, Jun. 2001, Part II, Section 2.7, pp. 351-369.

Lavie, N., Perceptual load as a necessary condition for selective attention. J Exp Psychol Hum Percept Perform. Jun. 1995;21(3):451-68.

Lavie, N., Distracted and confused?: selective attention under load. Trends Cogn Sci. Feb. 2005;9(2):75-82.

Lee, J.D., et al., Collision warning design to mitigate driver distraction. Proceedings of the SIGCHI Conference on Human Factors in Computing Systems (CHI '04), Vienna, Austria, Apr. 24-29, 2004, vol. 6, No. 1, pp. 65-72.

Lee, J., et al., Detection of Driver Distraction Using Vision-Based Algorithms. 23rd International Technical Conference on the Enhanced Safety of Vehicles (ESV), Seoul, South Korea, May 27-30, 2013, Paper No. 13-0348, 10 Pages.

Lee, J., et al., Investigating Drivers' Head and Glance Correspondence. arXiv preprint arXiv:1602.07324 (arXiv.org), Feb. 2016, 28 Pages.

Lee, J., et al., Linking the detection response task and the AttenD algorithm through the assessment of human-machine interface workload. Transportation Research Board 96th Annual Meeting, Washington, DC, vol. 17-06664, Jan. 2017, 15 pages.

Le-Hoa Võ, M., et al., The role of memory for visual search in scenes. Ann N Y Acad Sci. Mar. 2015;1339(1):72-81. doi: 10.1111/nyas.12667. Epub Feb. 12, 2015.

Lerner, N., et al., Driver strategies for engaging in distracting tasks using in-vehicle technologies. U.S. Department of Transportation, National Highway Traffic Safety Administration (NHTSA), DOT HS 810 919, Mar. 2008, 120 Pages.

Liang, Y., Detecting driver distraction. Ph.D. (Doctor of Philosophy Thesis), University of Iowa, 2009, 151 Pages, http://ir.uiowa.edu/etd/248.

Liang, Y., et al., How dangerous is looking away from the road? Algorithms predict crash risk from glance patterns in naturalistic driving. Hum Factors. Dec. 2012;54(6):1104-16.

Liang, Y., et al., A Looming Crisis: The Distribution of Off-Road Glance Duration in Moments Leading up to Crashes/Near-Crashes in Naturalistic Driving. Proceedings of the Human Factors and Ergonomics Society Annual Meeting, 2014;58(1):2102-2106.

McKnight, A.J., et al., Young novice drivers: careless or clueless? Accid Anal Prev. Nov. 2003;35(6):921-5.

Mehler, B., et al., Sensitivity of physiological measures for detecting systematic variations in cognitive demand from a working memory task: An on-road study across three age groups. Human Factors, Jun. 2012;54(3):396-412, DOI:10.1177/0018720812442086.

Mehler, B., et al., Multi-modal assessment of on-road demand of voice and manual phone calling and voice navigation entry across two embedded vehicle systems. Ergonomics. Mar. 2016;59(3):344-67. doi: 10.1080/00140139.2015.1081412. Epub Oct. 12, 2015.

Muñoz, M., et al., Distinguishing patterns in drivers' visual attention allocation using Hidden Markov Models. Transportation Research Part F: Traffic Psychology and Behavior, vol. 43, Nov. 2016, 90-103.

Nakamura, K., et al., Visual response properties of single neurons in the temporal pole of behaving monkeys. J Neurophysiol. Mar. 1994;71(3):1206-21.

Neisser, U., Cognition and Reality: Principles and Implications of Cognitive Psychology. W.H. Freeman and Company, San Francisco, CA, 1976, 230 Pages. Table of Contents, 28 Pages.

Neumann, O., et al., eds., Handbook of Perception and Action, vol. 3: Attention, Academic Press Inc., San Diego, CA, 1996, 448 Pages. Table of Contents, 8 Pages.

Norman, D.A., Categorization of action slips. Psychological Review, Jan. 1981;88(1):1-15.

Norman, D.A., et al., Attention to Action: Willed and Automatic Control of Behavior. Consciousness and Self-Regulation, R.J. Davidson, et al., eds., Springer Science + Business Media, New York, NY, Chapter 1, pp. 1-18, 1986.

Olson, R.L., et al., Driver Distraction in Commercial Vehicle Operations. U.S. Department of Transportation, Federal Motor Carrier Safety Administration (FMCSA), FMCSA-RRR-09-042, Sep. 2009, 285 Pages.

Owens, J.M., et al., Creation of the Naturalistic Engagement in Secondary Tasks (NEST) distracted driving dataset. J Safety Res. 2015, 10 Pages, http://dx.doi.org/10.1016/j.jsr.2015.07.001.

Perez, M., et al., Advanced Crash Avoidance Technologies (ACAT) Program—Final Report of the GM-VTTI Backing Crash Countermeasures Project. U.S. Department of Transportation, National Highway Traffic Safety Administration (NHTSA), DOT HS 811 452, Aug. 2011, 729 Pages.

Perez, M.A., et al., Assessment of naturalistic use patterns of advanced infotainment systems. Hum Factors. Jun. 2015;57(4):674-88. doi: 10.1177/0018720814564184. Epub Dec. 18, 2014.

(56) References Cited

OTHER PUBLICATIONS

Pezzulo, G., Schemas and Schema-based Architectures. Technical Report: Instituto di Linguistica Computazionale "Antonio Zampolli" of the National Research Council of Italy, Apr. 16, 2007, 9 Pages.

Pohl, J., et al., A driver-distraction-based lane-keeping assistance system. Proceeding of the Institution of Mechanical Engineers, Part I: Journal of Systems and Control Engineering (JSCE218), Jun. 1, 2007;221(4):541-552.

Posner, M.I., Orienting of attention. Q J Exp Psychol. Feb. 1980;32(1):3-25.

Potter, M.C., Understanding Sentences and Scenes: The Role of Conceptual Short-Term Memory. In Fleeting Memories: Cognition of Brief Visual Stimuli, V. Coltheart, ed., MIT Press, Cambridge, MA, 1999, Chapter 2, pp. 13-46.

Recarte, M.A., et al., Effects of verbal and spatial-imagery tasks on eye fixations while driving. J Exp Psychol Appl. Mar. 2000;6(1):31-43.

Regan, M.A., et al., Introduction. In Driver Distraction: Theory, Effects, and Mitigation. CRC Press, Taylor & Francis Group, Boca Raton, FL, 2009, Chapter 1, pp. 3-7.

Regan, M.A., et al., eds., Driver Distraction and Inattention: Advances in Research and Countermeasures, vol. 1. Ashgate Publishing Company, Burlington, VT, 2013, 464 Pages. Table of Contents, 11 Pages.

Reimer, B., et al., A field study on the impact of variations in short-term memory demands on drivers' visual attention and driving performance across three age groups. Hum Factors. Jun. 2012;54(3):454-68. Published online Feb. 29, 2012, DOI: 10.1177/0018720812437274.

Reimer, B., Organizer, Evaluating Demands Associated with the Use of Voice-Based In-Vehicle Interfaces. Proceedings of the Human Factors and Ergonomics Society 2016 Annual Meeting, 2016, vol. 60, Issue 1, pp. 2083-2087.

Reimer, B., et al., Multi-modal demands of a smartphone used to place calls and enter addresses during highway driving relative to two embedded systems. Ergonomics. Dec. 2016;59(12):1565-1585. Epub Apr. 25, 2016.

Rensink, R.A., Change detection. Annu Rev Psychol. 2002;53:245-77.

Rieman, J., et al., A dual-space model of iteratively deepening exploratory learning. Int J Human-Computer Studies, Jun. 1996;44(6):743-775.

Rydström, A., The effect of haptic feedback in visual-manual human-machine interaction. Licentiate Thesis, LuleåUniversity of Technology, Department of Human Work Sciences, 2007, 82 Pages.

Salvucci, D.D., et al., A two-point visual control model of steering. Perception. 2004;33(10):1233-48.

Samuel, S., et al., Evaluation of the minimum forward roadway glance duration. Transportation Research Record: Journal of the Transportation Research Board, No. 2518, Transportation Research Board, Washington, D.C., 2015, pp. 9-17. DOI: 10.3141/2518-02.

Schyns, P.G., et al., From blobs to boundary edges: Evidence for time-and spatial-scale-dependent scene recognition. Psychological Science, Jul. 1, 1994;5(4):195-200.

Seaman, S., et al., It's all in the timing: Using the AttenD algorithm to assess texting in the nest naturalistic driving database. 9th International Driving Symposium on Human Factors in Driver Assessment, Training and Vehicle Design, Jun. 2017, 7 pages.

Senders, J.W., et al., The attentional demand of automobile driving. Paper sponsored by the Committee on Highway Safety and presented at the 46th Annual Meeting, Highway Research Record, Issue 195, 1967, pp. 15-33.

Seppelt, B., et al., Differentiating cognitive load using a modified version of AttenD. Proceedings of the 9th International ACM Conference on Automotive User Interfaces and Interactive Vehicular Applications (AutomotiveUI'17), Oldenburg, Germany, Sep. 24-27, 2017, pp. 114-122.

Seppelt, B.D., et al., Glass half-full: On-road glance metrics differentiate crashes from near-crashes in the 100-car data. Accident Analysis & Prevention, vol. 107, Oct. 2017, pp. 48-62.

Simons, D.J., et al., Gorillas in our midst: sustained inattentional blindness for dynamic events. Perception. 1999;28(9):1059-74.

Smith, D.L., et al., Methodology for Capturing Driver Eye Glance Behavior During In-Vehicle Secondary Tasks. Transportation Research Record: Journal of the Transportation Research Board, vol. 1937, Transportation Research Board of the National Academies, Washington, D.C., 2005, pp. 61-65.

Sodhi, M., et al., Glance analysis of driver eye movements to evaluate distraction. Behav Res Methods Instrum Comput. Nov. 2002;34(4):529-38.

Stelmach, L.B., et al., Detection of stimulus change: the hypothetical roles of visual transient responses. Percept Psychophys. Mar. 1984;35(3):245-55.

Taylor, T.G., et al., Long Term Effects of Hazard Anticipation Training on Novice Drivers Measured on the Open Road. Proc Int Driv Symp Hum Factors Driv Assess Train Veh Des. 2011;2011:187-194.

Taylor, T., et al., The view from the road: the contribution of on-road glance-monitoring technologies to understanding driver behavior. Accid Anal Prev. Sep. 2013;58:175-86. doi: 10.1016/j.aap.2013.02.008. Epub Feb. 27, 2013.

Terry, H.R., et al., The role of looming and attention capture in drivers' braking responses. Accid Anal Prev. Jul. 2008;40(4):1375-82. doi: 10.1016/j.aap.2008.02.009. Epub Mar. 24, 2008.

Theeuwes, J., et al., Our Eyes do Not Always Go Where we Want Them to Go: Capture of the Eyes by New Objects. Psychological Science, Sep. 1, 1998;9(5):379-385.

Thorpe, S., et al., Speed of processing in the human visual system. Nature. Jun. 6, 1996;381(6582):520-2.

Tian, R., et al., Studying the Effects of Driver Distraction and Traffic Density on the Probability of Crash and Near-Crash Events in Naturalistic Driving Environment. IEEE Transactions on Intelligent Transportation Systems, IEEE, Sep. 2013;14(3):1547-1555.

Treat, J.R., et al., Tri-level study of the causes of traffic accidents: Final Report. Volume I: Causal factor tabulations and assessments. U.S. Department of Transportation, National Highway Traffic Safety Administration (NHTSA), DOT HS-805 085, Mar. 31, 1977, 596 Pages.

Underwood, G., et al., Visual search while driving: Skill and awareness during inspection of the scene. Transportation Research Part F: Traffic Psychology and Behavior, Jun. 2002;5(2):87-97.

Victor, T.W., et al., Sensitivity of eye-movement measures to in-vehicle task difficulty. Transportation Research Part F: Traffic Psychology and Behavior, Mar. 2005;8(2):167-190.

Victor, T.W., et al., Analysis of Naturalistic Driving Study Data: Safer Glances, Driver Inattention, and Crash Risk. Strategic Highway Research Program (SHRP), SHRP2 Safety Research, Transportation Research Board, Washington, D.C., 2015, SHRP 2 Report S2-S08A-RW-1, 138 Pages.

Viviani, P., Eye movements in visual search: Cognitive, perceptual and motor control aspects. Reviews of Oculomotor Research, 1990, vol. 4, Chapter 8, pp. 353-393.

Wang, J.-S., et al., The role of driver inattention in crashes: New statistics from the 1995 Crashworthiness Data System. Proceedings of the 40th Annual Conference of the Association for the Advancement of Automotive Medicine, Vancouver, British Columbia, Canada, Oct. 7-9, 1996, 20 Pages.

Wang, Y., et al., The sensitivity of different methodologies for characterizing drivers' gaze concentration under increased cognitive demand. Transportation Research Part F: Traffic Psychology and Behavior, Sep. 2014, vol. 26, Part A, pp. 227-237.

Wickens, C.D., et al., Attentional models of multitask pilot performance using advanced display technology. Hum Factors. 2003 Fall;45(3):360-80.

Wickens, C.D, et al., An Introduction to Human Factors Engineering, Second Edition, Pearson Prentice Hall, 2004, Pages 174-176.

Wickens, C.D., Attention to attention and its applications: A concluding view. Attention: From Theory to Practice, A.F. Kramer, et al., eds., Oxford University Press, USA, 2007, Part VII: Future Directions, Chapter 17, pp. 239-250.

(56) References Cited

OTHER PUBLICATIONS

Wickens, C.D., et al., Attention-situation awareness (A-SA) model of pilot error. Human Performance Modeling in Aviation, D.C. Foyle, et al., eds., CRC Press, Taylor & Francis Group, Boca Raton, FL, Dec. 2007, Chapter 9, Pages 213-240.

Wickens, C.D., et al., Applied Attention Theory. CRC Press, Taylor & Francis Group, Boca Raton, FL, 2008, 248 Pages. Table of Contents, 42 Pages.

Wierwille, W.W., Visual and manual demands of in-car controls and displays. In Automotive Ergonomics, B. Peacock, et al., eds., Taylor and Francis, London, UK, 1993, Chapter 14, pp. 299-320.

Wierwille, W.W., An initial model of visual sampling of in-car displays and controls. Vision in Vehicles IV, Elsevier Science Publishers B.V., A.G. Gale, et al., eds., Amsterdam, The Netherlands, 1993, pp. 271-280.

Wolfe, B., et al., Perceiving the roadway in the blink of an eye-rapid perception of the road environment and prediction of events. Proceedings of the Ninth International Driving Symposium on Human Factors in Driver Assessment, Training and Vehicle Design, Jun. 26-29, 2017, Manchester Village, Vermont, pp. 207-213.

Yantis, S., et al., Abrupt visual onsets and selective attention: evidence from visual search. J Exp Psychol Hum Percept Perform. Oct. 1984;10(5):601-21.

Yantis, S., et al., Abrupt visual onsets and selective attention: voluntary versus automatic allocation. J Exp Psychol Hum Percept Perform. Feb. 1990;16(1):121-34.

Young, R., et al., Road-to-Lab: Validation of the Static Load Test for Predicting On-Road Driving Performance While Using Advanced In-Vehicle Information and Communication Devices. Proceedings of the Third International Driving Symposium on Human Factors in Driver Assessment, Training and Vehicle Design, Rockport, Maine, Jun. 27-30, 2005, pp. 240-254.

Zhang, H., et al., A literature review of visual distraction research. SAfety VEhicles using adaptive Interface Technology (SAVE-IT)—Task 7 Final Report, Nov. 2004, 83 Pages.

Zhang, H., et al., Identification of real-time diagnostic measures of visual distraction with an automatic eye-tracking system. Hum Factors. 2006 Winter;48(4):805-21.

Zhang, Y, et al., Can you still look up? Remote rotary controller vs. touchscreen. SAE Technical Paper 2017-01-1386, Mar. 28 2017, 13 Pages, doi:10.4271/2017-01-1386.

* cited by examiner

SYSTEMS AND METHODS FOR USING AN ATTENTION BUFFER TO IMPROVE RESOURCE ALLOCATION MANAGEMENT

CROSS REFERENCE TO RELATED APPLICATION

The present application claims priority to and the benefit of U.S. Provisional Application No. 62/377,016, filed on Aug. 19, 2016 and titled "Attention Buffer," the content of which is incorporated herein by reference in its entirety.

FIELD

The present disclosure relates to systems and methods to assess an individual's attention across time in a dynamically changing environment and use that assessment in a variety of contexts, depending, at least in part, on the activity being performed by the individual. While the systems and methods related to such assessments can be used with respect to many activities, one non-limiting activity to which the present disclosures are applicable is the activity of driving.

BACKGROUND

Multi-tasking is a term that appears to be more prevalent in the vernacular than ever before. While the term multi-tasking may be thought of as a term that implies performing two disparate tasks (e.g., walking and participating in a text message conversation), in actuality many singular tasks themselves can be subdivided into multiple tasks (e.g., walking involves commanding legs to move, determining and moving in a particular direction, assessing the surrounding environment to avoid potential hazards, etc.). As access to information, and the types of information available, continues to increase, singular tasks are more often sub-dividable into multiple tasks because individuals performing a singular task do so by assessing multiple resources of information and acting upon that information. Not all information, however, is created equal. Some information is more helpful to the performance of a singular task than some other information, and some information may even distract and/or detract from an individual's ability to perform that singular task.

Driving is an example of a task that requires an individual, also referred to as operator of a vehicle or driver, to monitor multiple information sources over an extended period of time. Specifically, driving calls for the management of attention to many sources of information (e.g., visual, auditory, and other), and to the provision of multiple control inputs to the vehicle. Additionally, potential distractions at various locations relative to the driver's seat may compete for the driver's sensory, perceptual, and attentional resources, such as the immediate road and its condition (e.g., potholes, precipitation on the road, lane closures, speed limit signs), the immediate road surroundings (e.g., traffic, hazards, pedestrians, construction and its associated materials), general surroundings (e.g., weather, billboards), in-cab instrumentation (e.g., instrument clusters, infotainment centers, Global Positioning System devices, alerts, mirrors), passengers, and other objects (e.g., cell phones, beverages). Today, more than ever, drivers are faced with increasing competition for their attention due to the presence of in-vehicle information systems (e.g., instrument clusters, infotainment centers, etc.), cellular connectivity applications in modern vehicles, satellite navigation systems, and smart-phone applications, among other information resources. Furthermore, naturally occurring distracting activities, such as conversations by way of cellular phones, conversations with passengers, listening to the radio, mind-wandering, and roadside advertising, can also compete to draw the driver's attention away from the road. Notably, even for autonomous or semi-autonomous cars, these same challenges of resource allocation are prevalent as the system (e.g., one or more processors thereof) receives and responds to the various information sources to decide which actions to take while driving.

In view of the above, drivers (individuals and/or processors associated with a vehicle) must manage their attention to and from the roadway, deciding when, where, and for how long to remove their attention from the road. In light of the continually increasing volume of in-vehicle and out-of-vehicle attention-grabbing sources, there is rising concern that certain types and magnitudes of task demands on the driver may selectively impair elements of driving. These task loads may be sensory, perceptual, motoric, cognitive, mixed, etc. Systems and methods aimed to combat the pitfalls of distracted driving exist, but they suffer from many deficiencies. For example, some distracted driving detection techniques provide for a binary detection of distracted driving, determining the presence or absence of distracted driving based on negative driver behaviors that lead to adverse events (e.g., looking "off-road" for a certain amount of time). Upon identification of a distracted driving state, existing systems may take restrictive action with respect to in-vehicle systems to account for the distracted driving state, such as applying the brakes to slow the vehicle down. Such a binary system can be very rigid though, and may fail to account for various levels of distractions that may merit various levels of responses. Existing systems, like some binary systems, also fail to account for positive features of a driver's behavior, such as road scanning, which also play a role in the driver's resource allocation management.

As indicated above, managing multiple streams of information from various locations is a task not limited to driving. A person skilled in the art will appreciate that many tasks exist that require a person to balance multiple forms of information, assess the situation based on that information, and respond accordingly. This is particularly true in situations that involve dynamic engagement with a system and an uncertain environment in which multi-tasking is part of the primary task, and/or when both task-relevant and task-irrelevant activities are possible. Non-limiting examples of such tasks include walking, bicycling, flying, operating heavy machinery, and operating other modes of transportation, including surface transportation (e.g., operating trucks, buses, trains, subways, military vehicles such as tanks, etc.), maritime transportation (e.g., operating boats, submarines, etc.), and aerial transportation (e.g., operating airplanes, helicopters, dirigibles, etc.). The difficulties in balancing multiple forms of information is also not limited to vehicle operation and the like, as it impacts many process controls—particularly those with a fairly complex panel of controls and displays. By way of non-limiting examples, process controls that involve balancing multiple forms of information include operating any of nuclear energy facilities, manufacturing control facilities, flight control facilities, space mission control, communications control, etc. As the world becomes more connected, this information balancing act may involve either or both a person and a processor or the like, either or both of which may be involved in performing this balancing act. The processor may be part of an object with which the person is interacting—a vehicle and smartphones are two such objects—and/or it may part of a standalone computer, network of computers, etc. that gather and assess large amounts of data.

Accordingly, there is a need for systems and methods that better account for a system's and/or person's (e.g., driver's) task demand and attentional resource allocation. Such demands of task load may be multimodal, requiring multiple input modalities (e.g., vision, hearing, touch) and/or multiple output modalities (e.g., motor movements, speech, etc.), as well as requiring cognitive processing resources with the person. Improved systems and methods for accounting for the demands of tasks and attentional allocation would enhance the design of related interfaces of the object with which the person is engaging (e.g., in-vehicle interfaces and assistive technologies) to promote more effective resource allocation management. In the context of driving, this can lead to increased driving safety. More specifically, there is a need for robust methods central to supportive resource allocation systems, and for methods capable of assessing in real-time a person's situation awareness, accounting for factors that both positively and negatively enhance the person's situation awareness. Still further, these new systems and methods should be compatible with intelligent and assistive technologies (e.g., objects having some form of artificial intelligence or other learning or adaptive capabilities) to allow the technologies to adjust to improve the net result based on the knowledge of the person's situation awareness. In the context of vehicles, this can include intelligent vehicles or assistive technology systems, including fully-automated and semi-automated vehicles. The improvements, however, do not have to be implemented in or with such "smart" technology, and ideally can be adaptable for use in objects that are not necessarily set-up to have, or have limited capabilities with respect to, artificial intelligence or other learning or adaptive capabilities. With respect to vehicles, for example, new systems and methods preferably would have the ability to allow for the improved systems and methods to be provided by a plug-and-play, retrofit, or other means of set-up for incorporating safety systems and methods in vehicles, including those vehicles that do not have, or have limited capabilities with respect to, artificial intelligence or other learning or adaptive capabilities.

SUMMARY

Systems and methods are provided that utilize an attention buffer. The attention buffer is designed to continuously analyze various pieces of received information about a dynamically changing environment and continuously assess the impact of that information on the situation awareness of the person and/or object associated with that environment. The attention buffer quantifies the received information to make a determination of an awareness level of the person and/or object at any moment in time, referred to herein as a moment-to-moment buffer, a momentary buffer, and a moment buffer. The assessment occurs on a real-time, or near real-time, basis, accounting for the natural delay a person having skill in the art understands occurs even in systems qualified as "real-time." Based on that determination, many different actions can be performed. For example, if a momentary buffer indicates the attention needs to be shifted elsewhere, commands can be implemented to the person and/or object designed to cause such a shift. By way of a further non-limiting example, assessed momentary buffers can be used as information that is transmitted to one or more databases or the like for use in making assessments (e.g., determining insurance credits or rates). A whole host of possible responses to determined momentary buffers are provided for herein, and many other possible responses are derivable from the present disclosure.

In one exemplary embodiment, a method for real-time assessment of resource allocation is provided. The method includes receiving information in real-time about a plurality of glances of a user, with the glances occurring over a period of time. Each glance is classified as an on-target glance or an off-target glance. A moment-to-moment buffer value of an attention buffer is calculated on a continuous basis based on the classified glances, with the attention buffer being a range of values corresponding to an awareness level of the user. The calculated moment-to-moment buffer value is output such that the calculated moment-to-moment buffer value is known at any moment of time during performance of the method. Further, the method includes either or both: (1) providing instructions based on the continuously outputted calculated moment-to-moment buffer value; and/or (2) providing data to one or more databases, with the data including at least some continuously outputted calculated moment-to-moment buffer values of the continuously outputted calculated moment-to-moment buffer values over a period of time.

The information that is received in real-time about the plurality of glances can include frequency, duration, and location. Calculating on a continuous basis a moment-to-moment buffer value of an attention buffer based on the classified glances can include threading together the classified on-target glances and the classified off-target glances over a period of time, with the classified on-target and off-target glances including a duration for each such classified on-target and off-target glance.

The on-target and off-target glances can be further classified. For example, each of the on-target glances can be classified as being a centrally-located or a peripherally-located glance, while each of the off-target glances can be classified as being a situation awareness relevant or a situation awareness irrelevant glance. When the off-target glance is a situation awareness relevant glance, or a sequence of situation awareness relevant glances, calculating on a continuous basis a moment-to-moment buffer value of an attention buffer can include delaying application of a decrement rate of the attention buffer until after a delay period has expired and the situation awareness relevant glance is still the current classified glance. When the on-target glance is a centrally-located glance, calculating on a continuous basis a moment-to-moment buffer value of an attention buffer can include applying a decrement rate of the attention when a time for which the centrally-located glance occurs exceeds a threshold value.

In some instances, the provided for method can be performed in conjunction with the operation of a vehicle, in which case the user can be an operator of the vehicle (i.e., a driver). In such instances, the aforementioned situation awareness relevant glance can include a glance in any of the following locations: a rear view mirror, a side view mirror, a blind spot, a portion of an in-vehicle display on which information about at least one of vehicle performance, an automation state of the vehicle, a road and its conditions, environment data, surrounding data, and user data is displayed, and a location outside of the vehicle on which information about at least one of a road and its conditions, environment data, and surrounding data is displayed.

The method can also include comparing the continuously output calculated moment-to-moment buffer value to a threshold value. In such instances, where instructions are provided based on the continuously outputted calculated moment-to-moment buffer value, the provided instructions can be based on the comparison of the calculated moment-to-moment buffer value and the threshold value. In some such instances, the method can also include adjusting the threshold value in view of at least one of vehicle performance, an automation state of the vehicle, a road and its conditions, environment data, surrounding data, and user data.

In instances in which the method includes providing instructions based on the continuously outputted calculated moment-to-moment buffer value, the method can further include at least one of: (1) providing instructions configured to alter the awareness level of the user; (2) providing instructions to an automated system to adjust one or more parameters of the automated system in response to the continuously outputted calculated moment-to-moment buffer value; and (3) providing instructions to augment an exchange of information with the user. Augmenting an exchange of information with the user can include, for example, providing instructions to suppress an exchange of information with the user.

The attention buffer can include an equation having a plurality of variables that impact the moment-to-moment buffer value. The plurality of variables can be configured to cause a rate between moment-to-moment buffer values to increase or decrease at a variable rate. In instances in which the attention buffer includes an equation that has a plurality of variables that impact the moment-to-moment buffer value, the variables can include at least one of: (1) increment rate; (2) decrement rate; (3) initial value start; (4) switching cost; (5) existence of a glance rate decrement; and (6) a location-based latency. Further, the method can include selecting one or more of the variables to rely upon to perform the action of calculating of the moment-to-moment buffer value, such selection being based on at least one of the following factors: (1) broad situational demands; (2) immediate task demands; and (3) an information processing state. In some such embodiments, the equation of the attention buffer can account for: (1) a duration of the on-target glances and a duration of the off-target glances; and/or (2) glance transitions. An artificial intelligence component can be operated to adjust the attention buffer based on learned information about at least one of the user and an environment impacting the user.

As previously indicated, in some instances the user can be an operator of a vehicle. When the method includes providing instructions based on the continuously outputted calculated moment-to-moment buffer value, the instructions can be provided to any one or combination of the vehicle, the operator of the vehicle, and a receiver configured to receive the instructions. The instructions can be based on the continuously outputted calculated moment-to-moment buffer value. In some such embodiments, the method can further include communicating with one or more components of the vehicle to at least continuously output the calculated moment-to-moment buffer value and provide instructions to any one or combination of the vehicle, the operator of the vehicle, and the receiver based on the continuously outputted calculated moment-to-moment buffer value. Some non-limiting examples of the component(s) of the vehicle with which can be communicated include an automation system, an adaptive interface, a context-aware vehicle control system, and in-vehicle displays. The automation system can be configured to automate one or more actions associated with the vehicle. The adaptive interface can be configured to respond to change at least one of: one or more functions and content provided to the operator of the vehicle; one or more modalities in which content is provided to the operator; and a nature of one or more control inputs, to effectively assist the operator of the vehicle in attending to an environment in a way that promotes situation awareness. The context-aware vehicle control system can be configured to adjust parameters of the vehicle in response to at least one of a surrounding environment of the vehicle, knowledge, and the awareness level of the operator of the vehicle. And the in-vehicle displays can be configured to provide to the operator of the vehicle information about the vehicle and/or control of aspects of the vehicle. In some embodiments, the instructions provided to any one or combination of the vehicle, the operator of the vehicle, and the receiver configured to receive the instructions can be adapted based on changes made by the operator of the vehicle during operation of the vehicle and/or changes to an environment surrounding the vehicle.

In embodiments in which the user is an operator of a vehicle, the method can include providing data to one or more databases for a variety of purposes. The data can include at least some continuously outputted calculated moment-to-moment buffer values of the continuously outputted calculated moment-to-moment buffer values over a period of time. In some such instances, the provided data can be configured for use to define an operator profile based on the received moment-to-moment buffer values. Additionally, or alternatively, the provided data can be configured for use to define a global profile based on at least one of a mean, mode, variability, moving average window, standard deviation, distribution summary, moment-to-moment aggregate plot, advanced metrics involving Fourier analysis of spectral width and power, and Symbolic Aggregate Approximation, that is calculated from at least some portion of the received moment-to-moment buffer values. In some embodiments in which the user is an operator of a vehicle, and data is provided to one or more databases, the data can include at least some continuously outputted calculated moment-to-moment buffer values over a period of time. The provided data can include information that is relevant for determining insurance credits and/or insurance rates, among other uses.

One exemplary embodiment of a resource allocation management system for a vehicle includes at least one processor that is in communication with one or more glance-measuring devices (e.g., cameras and sensors) associated with a vehicle. The processor(s) is operable to perform a variety of functions. For example, the processor(s) is operable to receive information in real-time about a plurality of glances of an operator of the vehicle associated with one or more glance-measuring devices in communication with the at least one processor, the plurality of glances occurring over a period of time. Further, the processor(s) is operable to classify each of the plurality of glances as an on-road glance or an off-road glance, and calculate on a continuous basis a moment-to-moment buffer value of an attention buffer based on the classified glances. The attention buffer is a range of values that corresponds to an awareness level of the operator of the vehicle. Still further, the processor(s) is operable to continuously output the calculated moment-to-moment buffer value such that the calculated moment-to-moment buffer value is known at any moment of time during which the processor(s) is operating to calculate the moment-to-moment buffer value, and provide instructions to at least one of the vehicle, the operator of the vehicle, and a receiver that is configured to receive the instructions from the processor(s). The instructions are based on the continuously outputted calculated moment-to-moment buffer value.

The processor(s) can be configured to communicate with one or more components of the vehicle to continuously output the calculated moment-to-moment buffer value and/or provide the instructions to at least one of the vehicle, the operator of the vehicle, and a receiver configured to receive the instructions form the processor(s). Some non-limiting examples of the component(s) of the vehicle with which the processor(s) can communicate include an automation system, an adaptive interface, a context-ware vehicle control system, and in-vehicle displays. The automation system can be configured to automate one or more actions associated with the vehicle. The adaptive interface can be configured to respond to change at least one of: one or more functions and content provided to the operator of the vehicle; one or more modalities in which content is provided to the operator; and a nature of one or more control inputs. Such changes can be effective to assist the operator of the vehicle in attending to an environment in a way that promotes situation awareness. The context-aware vehicle control system can be configured to adjust parameters of the vehicle in response to at least one of a surrounding environment of the vehicle, knowledge, and the awareness level of the operator of the vehicle. And the in-vehicle displays can be configured to provide to the operator of the vehicle information about the vehicle and/or control of aspects of the vehicle. A receiver to which the processor(s) is operable to provide instructions can be a receiver that is configured to receive information for any one or combination of a second vehicle in the vicinity of the vehicle associated with one or more glance-measuring device with which the processor(s) is in communication, a smart device (e.g., smartphone, tablet, computer, smartwatch, and smart car), and a database. In some embodiments, the processor(s) can be configured to adapt the instructions provided to any one or combination of the vehicle, the operator of the vehicle, and a receiver configured to receive the instructions from the processor(s) to receive instructions from the processor(s) based on changes made by the operator of the vehicle during operation of the vehicle and/or changes to an environment surrounding the vehicle.

A variety of instructions can be provided to at least one of the vehicle, the operator of the vehicle, and a receiver configured to receive the instructions from the processor(s). For example, the instructions provided can be instructions configured to alter the awareness level of the operator of the vehicle. Additionally, or alternatively, the instructions provided can be to an automation system of a vehicle to adjust one or more parameters of the vehicle in response to the continuously outputted calculated moment-to-moment buffer value. Still further, additionally, or alternatively, the instructions provided can be to augment an exchange of information with the vehicle and/or the operator of the vehicle. The instructions to augment an exchange of information with the vehicle and/or the operator of the vehicle can include, for example, providing instructions to suppress an exchange of information.

The information that is received in real-time about the plurality of glances can include frequency, duration, and location. The operability of the processor(s) to calculate on a continuous basis a moment-to-moment buffer value of an attention buffer based on the classified glances can include the processor(s) being operable to thread together the classified on-road glances and the classified off-road glances over a period of time, with the classified on-road and off-road glances including a duration for each such classified on-road and off-road glance.

The on-road and off-road glances can be further classified. For example, each of the on-road glances can be classified as being a centrally-located or a peripherally-located glance, while each of the off-road glances can be classified as being a situation awareness relevant or a situation awareness irrelevant glance. Some non-limiting examples of situation awareness relevant glances include a glance in any of the following locations: a rear view mirror, a side view mirror, a blind spot, a portion of an in-vehicle display on which information about at least one of vehicle performance, an automation state of the vehicle, a road and its conditions, environment data, surrounding data, and user data is displayed, and a location outside of the vehicle on which information about at least one of a road and its conditions, environment data, and surrounding data is displayed. When the off-road glance is a situation awareness relevant glance, or a sequence of situation awareness relevant glances, the attention buffer can account for such a glance, or sequence of glances, by delaying application of a decrement rate of the attention buffer during the calculation of the moment-to-moment buffer value. The decrement rate can be applied by the attention buffer after a delay period has expired and the situation awareness relevant glance is still the current classified glance. The attention buffer can account for the centrally-located glance being too long by applying a decrement rate during the calculation of the moment-to-moment buffer value when a time for which the centrally-located glance occurs exceeds a threshold value.

The processor(s) can be further operable to compare the continuously output calculated moment-to-moment buffer value to a threshold value. In some such embodiments, the processor(s) being operable to provide instructions to any one or combination of the vehicle, the operator of the vehicle, and a receiver configured to receive the instructions from the processor(s) can provide instructions that are selected based on the comparison of the calculated moment-to-moment buffer value and the threshold value. The processor(s) can be further operable to adjust the threshold value in view of at least one of vehicle performance, an automation state of the vehicle, a road and its conditions, environment data, surrounding data, and user data.

The attention buffer can include an equation having a plurality of variables that impact the moment-to-moment buffer value. The variables can include at least one of: (1) increment rate; (2) decrement rate; (3) initial value start; (4) switching cost; (5) existence of a glance rate decrement; and (6) a location-based latency. Further, the processor(s) can be further operable to select one or more of the variables to rely upon to calculate the moment-to-moment buffer value, such selection being based on at least one of the following factors: (1) broad situational demands; (2) immediate task demands; and (3) an information processing state. In some such embodiments, the equation of the attention buffer can account for: (1) a duration of the on-road glances and a duration of the off-road glances; and/or (2) glance transitions. An artificial intelligence component can be operated to adjust the attention buffer based on learned information about at least one of the user and an environment impacting the user.

The processor(s) can include an artificial intelligence component. The intelligence component can be configured to adjust the attention buffer based on information learned by the processor(s) about at least one of the vehicle, the operator of the vehicle, and an environment surrounding the vehicle. In some instances, the processor(s) is operable to provide instructions to the receiver that is configured to receive the instructions from the processor(s) that includes the moment-to-moment buffer values over a period of time. The receiver can be communicatively coupled to at least one profile-determining processor, with the at least one profile-determining processor being configured to define an operator profile and/or a global profile. The operator profile can be based on the moment-to-moment buffer values received by the receiver, and the global profile can be based on at least one of a mean, mode, variability, moving average window, standard deviation, distribution summary, moment-to-moment aggregate plot, advanced metrics involving Fourier analysis of spectral width and power, and Symbolic Aggregate Approximation, that is calculated from at least some portion of the received moment-to-moment buffer values received by the receiver. In some instances in which the processor(s) is operable to provide instructions to the receiver that is configured to receive the instructions from the processor(s), the instructions can include information relevant for determining insurance credits and/or insurance rates.

In one exemplary method for allocating resources, the method includes classifying a glance as an on-target glance or an off-target glance for use in quantifying a momentary buffer value. If the glance is classified as an on-target glance, the method further includes determining if an immediately preceding glance was an on-target glance or an off-target glance, and determining a momentary buffer value for the glance. If the immediately preceding glance was an off-target glance, the method also includes accounting for a transition associated with moving from the off-target glance to the on-target glance. If the glance is classified as an off-target glance, the method further includes classifying the off-target glance as being a situation awareness relevant glance or a situation awareness irrelevant glance, and determining a momentary buffer value for the glance. If the off-target glance is a situation awareness relevant glance, determining a momentary buffer value for the glance also includes accounting for a latency.

If the glance is an on-target glance, the method can include classifying the on-target glance as being a centrally-located glance or a peripherally-located glance. If the on-target glance is a centrally-located glance, determining a momentary buffer value for the glance can include accounting for an instance in which a duration of time for consecutive centrally-located glances exceeds a threshold time, while if the on-target glance is a peripherally-located glance, determining a momentary buffer value for the glance can include determining the momentary buffer value for the glance based on at least one of an initially-determined momentary buffer value, a maximum buffer value, and an increment value associated with the on-target glance. Further, if the on-target glance is a centrally-located glance, in some instances determining a momentary buffer value for the glance can include determining the duration of time for consecutive centrally-located glances, and comparing the duration of time for the consecutive centrally-located glances to the threshold time. If the duration of time for the consecutive centrally-located glances is equal to or greater than the threshold time, the method can further include comparing an initially-determined momentary buffer value to an on-target buffer decrement floor value. If the initially-determined momentary buffer value is greater than the on-target buffer decrement floor value, determining a momentary buffer value for the glance can further include setting the momentary buffer value as the initially-determined momentary buffer value less a decrement value associated with the on-target glance, while if the initially-determined momentary buffer value is less than or equal to the on-target buffer decrement floor value, determining a momentary buffer value for the glance can further include setting the momentary buffer value as the on-target buffer decrement floor value. However, if the duration of time for the consecutive centrally-located glances is less than the threshold time, determining the momentary buffer value for the glance can include determining the momentary buffer value for the glance based on at least one of the initially-determined momentary buffer value, the maximum buffer value, and the increment value associated with the on-target glance.

If the glance is an off-target glance, determining a momentary buffer value for the glance can be based on at least one of an initially-determined momentary buffer value, a minimum buffer value, and a decrement value associated with the off-target glance. Further, if the off-target glance is classified as a situation awareness relevant glance, the method can include determining a latency value associated with the momentary buffer value and comparing the determined latency value with a threshold latency value. If the determined latency value is less than or equal to the threshold latency value, determining a momentary buffer value for the glance can include setting the momentary buffer value as the initially-determined momentary buffer value, while if the determined latency value is greater than the threshold latency value, the method can further include comparing the initially-determined momentary buffer value to the minimum buffer value. If the initially-determined momentary buffer value is less than or equal to the minimum buffer value, determining a momentary buffer value for the glance can further include setting the momentary buffer value as the minimum buffer value, while if the initially-determined momentary buffer value is greater than the minimum buffer value, determining a momentary buffer value for the glance can further include setting the momentary buffer value as the initially-determined momentary value less the decrement value associated with the off-target glance.

If the off-target glance is classified as a situation awareness irrelevant glance, the method can include comparing the initially-determined momentary buffer value to the minimum buffer value. If the initially-determined momentary buffer value is less than or equal to the minimum buffer value, determining a momentary buffer value for the glance can include setting the momentary buffer value as the minimum buffer value, while if the initially-determined momentary buffer value is greater than the minimum buffer value, determining a momentary buffer value for the glance can include setting the momentary buffer value as the initially-determined momentary buffer value less the decrement value associated with the off-target glance.

Accounting for a transition associated with moving from the off-target glance to the on-target glance can include determining an information extraction latency value for the on-target glance and comparing the information extraction latency value to a threshold information extraction latency value. If the information extraction latency value is less than the threshold information extraction latency value, determining a momentary buffer value for the glance can include setting the momentary buffer value as the initially determined momentary buffer value, while if the information extraction latency value is greater than or equal to the threshold extraction latency value, the method can further include classifying the on-target glance as being a centrally-located glance or a peripherally-located glance. If the on-target glance is a centrally-located glance, determining a momentary buffer value for the glance can include accounting for an instance in which a duration of time for consecutive centrally-located glances exceeds a threshold time, while if the on-target glance is a peripherally-located glance, determining a momentary buffer value for the glance can include determining the momentary buffer value for the glance based on at least one of an initially-determined momentary buffer value, a maximum buffer value, and an increment value associated with the on-target glance.

The method can further include storing the determined momentary buffer value, exporting the determined momentary buffer value, and repeating at least some of the previously described steps associated with classifying a glance as an on-target glance or an off-target glance for use in quantifying a momentary buffer value to determine one or more subsequent momentary buffer values. In some embodiments, the method can further include adjusting one or more threshold values (e.g., a threshold time associated with a duration of time for consecutive same-located glances, a threshold latency value associated with one or more momentary buffer values, a threshold information extraction latency value associated with the glance) used in conjunction with determining a momentary buffer value for the glance.

In some instances, the glance that is classified is a glance that is performed while operating a vehicle. In such instances, the on-target glances can be considered on-road glances and the off-target glances can be considered off-road glances. The method can further include providing the determined momentary buffer value to one or more databases, such as databases configured to define an operator profile and/or a global profile. In such instances, at least some of the previously described steps associated with classifying a glance as an on-target glance or an off-target glance for use in quantifying a momentary buffer value to determine one or more subsequent momentary buffer values can be repeated to determine one or more subsequent momentary buffer values. The determined one or more subsequent momentary buffer values can be provided to the database(s). The operator profile can be defined based on the provided determined momentary buffer value and the determined subsequent momentary buffer value(s), and the global profile can be defined based on at least one of a mean, mode, variability, moving average window, standard deviation, distribution summary, moment-to-moment aggregate plot, advanced metrics involving Fourier analysis of spectral width and power, and Symbolic Aggregate Approximation, that is calculated from at least some portion of the determined momentary buffer value and the subsequent momentary buffer value(s). In some instances, the method can further include providing the determined momentary buffer value to one or more databases configured to be used for determining insurance credits and/or insurance rates.

The method can further include operating an artificial intelligence component to adjust one or more threshold values used in conjunction with determining a momentary buffer value for the glance. In some such embodiments, adjustment of the threshold value(s) can be based on learned information about at least one of a user and an environment impacting the user.

BRIEF DESCRIPTION OF DRAWINGS

This disclosure will be more fully understood from the following detailed description taken in conjunction with the accompanying drawings, in which.

DETAILED DESCRIPTION

Figure 1:
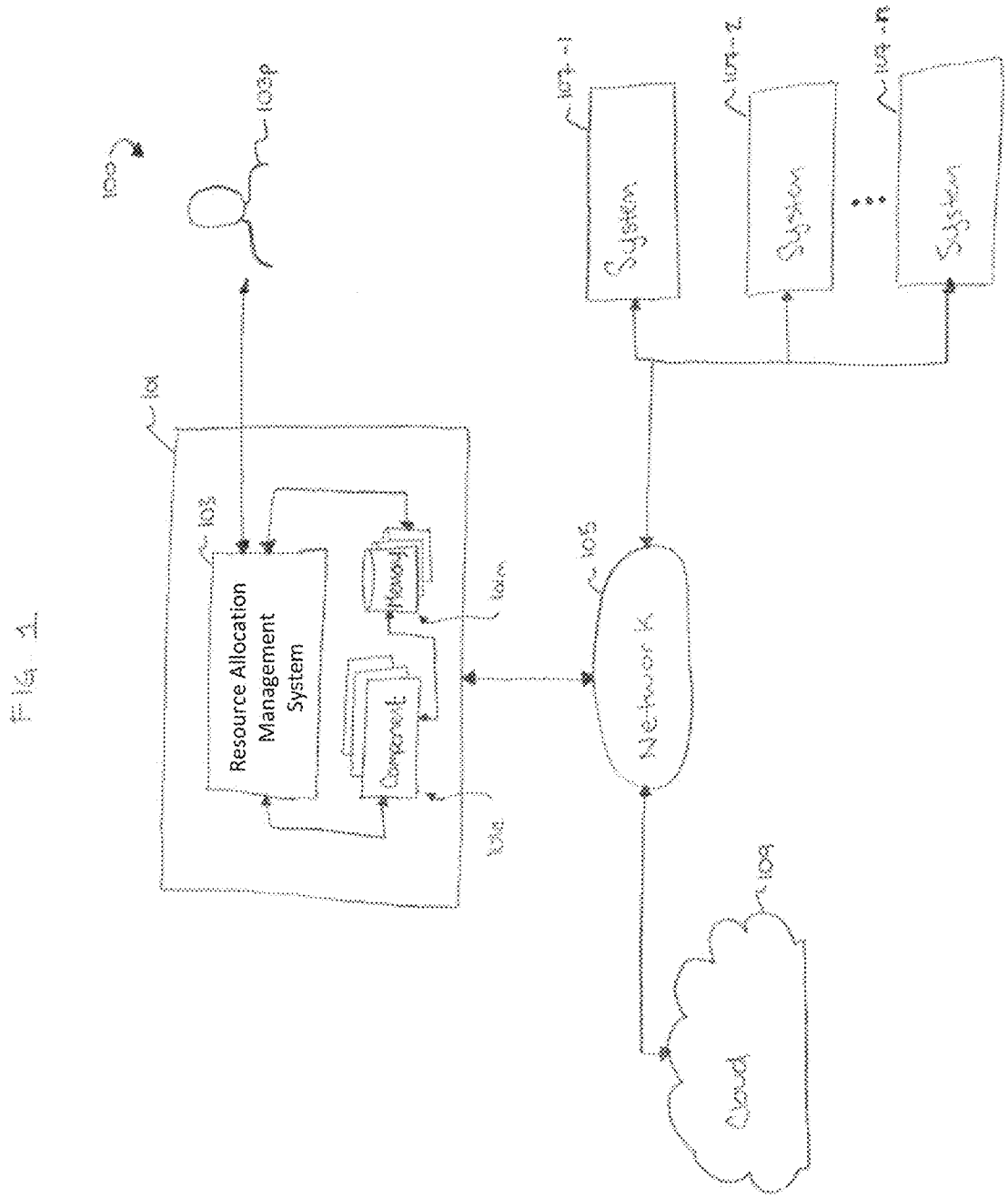
FIG. 1 is a schematic diagram of one exemplary embodiment of a computing device ecosystem that includes a resource allocation system.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. In the present disclosure, like-numbered components of various embodiments generally have similar features when those components are of a similar nature and/or serve a similar purpose. A person skilled in the art, in view of the present disclosure, will understand various instances in which like-numbered components across various figures are akin. Additionally, in a number of instances, various terms understood or otherwise known to those skilled in the art, and/or provided for in the present disclosure, are used interchangeably. By way of non-limiting example, terms such as awareness (including "level of awareness"/"awareness level" and "amount of awareness"), attention (including "level of attention"/"attention level" and "amount of attention"), and situation information (including "level of situation information"/"situation information level" and "amount of situation information"), as well as operator and user (among other terms used in this context), may be used interchangeably.

The present disclosure is directed to the real-time assessment of resource allocation. The resources can come in a variety of forms, including visual information perceived by the user and/or information supplied by various sensors associated with the system being operated by the user. A user can be, but is not necessarily, a person. In the context of the present disclosure, a user can also be a system or object (e.g., an autonomous vehicle and its related components) capable of receiving and synthesizing information. As described herein, resource allocation may include a user's awareness level, attention level, and/or level of situation information, and the provided for systems and methods provide for ways by which the various resources available to the user can be appropriately managed to improve the user's experience, such as by improving the user's situation awareness (SA). In many of the described embodiments, the SA relates to a driver's SA of the vehicle in which the driver is operating and the environment surrounding that vehicle, although the present disclosure is by no means limited to usage only in vehicles. For example, in non-vehicle applications, the SA of the user refers generally to the user's awareness of the environment and surrounding factors that impact the user (e.g., information and data about the user and/or any system, objects, etc. the user is operating), which together may be referred to as "an environment impacting the user," or other similar term. Just as the term "individual" is not limited to a person, terms like "operator" and "driver" can also encompass systems and objects capable of receiving and synthesizing the related operation/driving information. Some non-limiting examples of other contexts in which the resource allocation systems and methods provided for herein can be used include walking, riding a bicycle, flying, operating heavy machinery, and various data management and analysis platforms (e.g., determining insurance credits and making other insurance-related determinations, managing vehicle fleets, monitoring consumer attention with respect to retail, determinations made in actuarial science, accident reconstruction, and law enforcement). In fact, the present disclosures can be applied to any of the uses described above as involving balancing multiple forms of information (e.g., surface transportation, maritime transportation, aerial transportation, process controls, etc.), and any other uses known to those skilled in the art in view of the present disclosure.

The systems and methods provided include an attention buffer, which is a dynamically changing metric having a range of values that correspond to an awareness level of the user, or an amount/level of situation information possessed by a user. The awareness level refers to the situation, or scene, awareness of the user, accounting for various factors, including but not limited to information viewed or otherwise sensed by the user, information provided to the user through various sensors and monitoring systems, and other ways by which a particular object being operated by the user is able to receive and/or determine information that may influence the situation in which the user exists. By way of example, in instances in which the provided for attention buffer is used in conjunction with the operation of a vehicle, the buffer can receive information about where and for how long a user glances at particular locations with respect to the vehicle, as well as information related to the vehicle itself (e.g., its speed, location, etc.), the driver (the driver's familiarity with the location, the drowsiness of the driver, whether the driver is typically an aggressive driver, etc.), and an environment surrounding the vehicle (data from other surrounding vehicles, obstacles, road signage, potential hazards, the weather, the road conditions, etc.).

The attention buffer may provide a metric of the user's attention level while the user is performing one or more tasks (e.g., driving). The buffer quantifies the attention or awareness level of the user, where an attention or awareness level is here referent to an assessment of how cognizant a user is of the surroundings related to the task the user is performing. An awareness level may also encompass a state of knowledge with respect to the conditions and/or surrounding environment, the state of knowledge being attributable to the user and/or a system, object, etc. with which the user is engaging. The surroundings can include information and data about any object or system being operated by the user, information and data about an environment in which the object or system is being operated, and/or information and data about the user, including user-specific information and data, as well as data or information that is relevant based on one or more known characteristics or the like about the user (e.g., age, skill level, etc.). Collectively this information and data may be referred to as an environment surrounding the vehicle, thus indicating that an environment surrounding the vehicle is inclusive of the environment data and the surrounding data as provided for herein or otherwise known to those skilled in the art. As explained herein, a user is not even necessarily a person, as it can be the system itself, such as an autonomous or semi-autonomous vehicle.

The provided for buffer is designed to continuously calculate a moment-to-moment buffer value, which is an instantaneous measurement of the level of situation information in the buffer at that moment, and/or the level of situation awareness held by the operator. These are products of, or result from, the operator's attention, and exist within the operator's attention at the moment. The buffer can be a function of one or more factors, including but not limited to user glance metrics received or made by the system. As provided for herein, each input glance can be classified by the provided for systems and methods to determine the moment-to-moment buffer value at the moment of the input glance. The quantification can be on a scale (e.g., having a low value and a high value, and the moment-to-moment buffer value falling somewhere in the range of the low and high values) and/or include thresholds within the scope of the scale that can drive actions, results, etc.

In instances in which the moment-to-moment buffer value falls above or below a desired threshold (or out of a range of desired values), the disclosed systems and methods may provide for actions that assist in adjusting the moment-to-moment buffer value to a desired value (or such that the moment-to-moment buffer value falls within a range of desired values). The quantified awareness or information level can result in many different actions, as further detailed below. Such actions can include augmenting interfaces (e.g., displays or other information available to an operator of a vehicle, such as information concerning the vehicle and its control), automation (e.g., causing a system to take over more control), elements of control (e.g., selectively activating or deactivating various control systems), information flow (e.g., altering information flow to or from the user and/or the vehicle including suppressing information, increasing provided information, or changing the type of information that is provided and/or how the information is displayed), and/or other intelligent agents in view of the moment-to-moment buffer value at a specific point in time in comparison to a threshold value.

The processor may include an artificial intelligence component configured to take action to adjust the attention buffer based on learned information about at least one of the vehicle, the operator, and the environment and related factors during operation. When action is taken that impacts the performance of the vehicle, such as augmentation of automation or elements of control, it may be referred to as augmenting a state of the vehicle. Any of the aforementioned actions may include the processor sending instructions to at least one of the vehicle, the operator of the vehicle, a receiver, and/or a connected smart device to take the desired action or trigger the desired response. The instructions may be sent to a local location and/or a remote location. For example, the receiver may be part of the vehicle itself or may be associated with a third-party computer connected wirelessly to the resource allocation management system. In some instances, instructions may be provided to the user encouraging the user to take particular steps to change the moment-to-moment buffer value and/or instructions to a system to adjust the moment-to-moment buffer value in an automated manner. These actions can include actions to increase the moment-to-moment buffer value to improve the user's SA or actions to decrease the moment-to-moment buffer value if the system determines the user is hyperaware. As described in greater detail below, and as understood by a person skilled in the art, the types of instructions that can be provided can come in various other forms as well. In fact, in some instances, the instructions may involve transferring information to a smart device, database, or the like for subsequent analysis or usage in making further calculations (e.g., adjusting insurance rates, operating various apps designed to utilize the determined moment-to-moment buffer value, etc.), and/or removing information for a period of time, deactivating controls for a period of time, etc.

At a most basic level for systems and methods that utilize glance metrics as part of the attention buffer, the glances can be qualified as "on-target" or "off-target" to determine the effect on the user's attention. At a more specific level, the "on-target" and "off-target" glances can be further analyzed to specifically account for their impact on awareness levels, as some types of glances may provide SA even if they are considered "off-target." For example, in a situation in which driving is being evaluated, certain "off-target" glances (e.g., glances away from the road) may provide SA such as determining the difference in permissible versus current speed by viewing some combination of a speed limit sign and the user's own speedometer. Accordingly, the present disclosure provides for the further classification of regions of eccentricity to account for certain types of glances that would otherwise be considered "off-target" but actually provide the operator SA-relevant information (e.g., viewing a blind spot), as well as certain types of glances that would otherwise be considered on-target" but, dependent on factors such as their length, distribution, and/or sequence over time, do not uniformly provide the operator SA-relevant information (e.g., staring at a same location, such as a center of a road, for too long of a period of time). A new moment-to-moment buffer value can be calculated following the input of each glance and/or other information inputted into the attention buffer, with the attention buffer accounting for these more nuanced evaluations of whether glances provide SA-relevant information.

The moment-to-moment buffer value, also referred to as a momentary buffer value and a moment buffer value herein (and in some instances, the word "value" is not used, and a person skilled in the art will understand what the phrases "moment-to-moment buffer," "momentary buffer," and "moment buffer" cover), can be continuously output to one or more components or devices of a monitored system such that the calculated momentary buffer value is known at any moment during operation by the user. Additionally, the system may output metrics or statistics reflecting lifetime values of the attention buffer. By way of non-limiting example, this may include the mean, mode, minimum, maximum, variability, or moving average window of the attention buffer, related standard deviations, distribution summaries (e.g., use of certain percentile values, such as a $75^{th}$ percentile for mean and standard deviation cutoffs to parse out meaningful differences between user groups), moment-to-moment aggregate plots, advanced metrics that can be produced by Fourier analysis of spectral width and power and the like, Symbolic Aggregate Approximation techniques, and other statistical data or metrics that are derivable in view of the present disclosure and knowledge of those skilled in the art. The components of the monitored system may then use the momentary buffer value or attention buffer measurements to aid the user with respect to attentional allocation, attention level, and/or safe system operation, among other uses that are provided for herein. Furthermore, in lieu of or in addition to providing aid to the user in real-time, the resource allocation management system may output the momentary buffer value and/or attention buffer statistics to a stored memory device or one or more connected devices, including devices owned by the user and/or a third party. The data can then be later accessed for evaluation and interpretation in applications that would benefit from monitoring a user's attention. By way of non-limiting example, this information could be accessed by law enforcement, those who reconstruct accidents, actuarial scientists, insurance companies, or vehicle fleet managers (e.g., delivery vehicles, transportation systems like buses or trains, etc.). Data acquired as a result of the present disclosures can be used to manage or assess attention at an individual level and/or can be acquired at a population level to sum attention habits across a series of individuals.

While the present disclosure refers to assessments occurring in "real-time," a person skilled in the art will appreciate that real-time assessments includes near real-time assessments, accounting for the natural delay a person having skill in the art understands occurs even in systems qualified as real-time. In some instances, real-time means that the time from which the resource allocation data is measured or otherwise received, the momentary buffer value is measured, and a response in view of the measured momentary buffer value is provided (e.g., augmentation of various components, sending data to a database, smartphone, or the like, providing instructions to an operator and/or the object or system with which the operator is engaging, etc.). In the present disclosure, these actions can occur in the order of milliseconds or microseconds, and may be understood to interchangeably be "real-time" even though it may actually be "near real-time."

Resource Allocation Management Ecosystem

Before describing the attention buffer, it is useful to understand various environments in which it can be employed. FIG. 1 illustrates an exemplary embodiment of a computing device ecosystem 100 in which the present disclosures related to managing resource allocation can be used. In some embodiments, the term "resource allocation" is used herein to refer to the various amounts of information that can be provided to a user of the systems and methods provided. This can include, for example, determinations made about a user's glances, and may also include other information related to the systems and methods as a whole, such as information gleaned from various sensors associated with the systems and methods provided. To the extent the present disclosure describes the allocation of visual attention, such allocation can involve assessing a persons' vision, gaze(s), glance(s), head position or pose, and the like, including assigning the eye movements to a spatial region, location, direction, or the like at a given time. It should be understood that managing visual allocation refers, in some embodiments, to obtaining and analyzing visual data (e.g., glance direction, glance duration, glance transitions) and/or contextual data related to the task being performed and outputting information based thereon. It should be understood that the visual data can serve as a proxy for visual attention and/or awareness, meaning that the obtained visual data can represent or imply attention or awareness information. Likewise, the outputs described herein can be used to manage, alter, encourage, or otherwise have an effect on a human's, or a system or device's, visual attention or awareness. Further, because the present disclosure more broadly covers resource allocation, a person skilled in the art will recognize that visual attention or awareness is a subset of the types of resources that can be involved in determining attention or awareness levels of a user when operating the attention buffer as provided for herein. Many examples of non-visual resources are provided in the present disclosure, and are likewise derivable by a person skilled in the art in view of the present disclosure.

The ecosystem 100 includes various systems, devices, objects, networks, infrastructures, and the like that are configured to collect, store, manipulate, and calculate data to manage a person's resource allocation. It should be understood that the computing device ecosystem 100 can include any number and type of interconnected systems, devices, objects, infrastructure, and the like. For example, the ecosystem 100 can refer to the Internet of Things (IoT), a home network, an office network, or a similar set of interconnected devices. It should also be understood that, in the illustrated exemplary computing device ecosystem 100, data can be transferred via wired or wireless communications.

As shown in FIG. 1, the ecosystem 100 includes a resource allocation management system 103 that is configured to, among other things, manage the allocation of various amounts of information received by a monitoring system 101 and/or a person 103$p$ using the monitoring system 101. To this end, the resource allocation management system 103 collects or determines information, including but not limited to visual allocation data of the person 103$p$. As explained in further detail below, visual data can include, in raw form, imaging of the person 103$p$ and, in processed form, data derived therefrom, such as eye image sequences, pupil positions, other visual features, glance directions, glance durations, glance transitions, and the like. It should be understood that the terms "individuals," "humans," "people," "persons," "users," and other similar terms are used interchangeably herein to refer to the person or persons whose attention, and data related thereto, is captured and/or processed by the resource allocation management system 103. As explained above, terms like "individuals" and "users" are not so limiting as to be a human, but rather, can be a system, device, object, etc. capable of receiving, determining, and/or synthesizing information, and to the extent terms like "humans," "people," and "persons," are used, such usage does not preclude systems, devices, objects, etc. from being used in the same or similar manner. It should also be understood that the resource allocation management system 103, and the other components and/or systems of the computing device ecosystem 100, are configured to manage visual allocation of any number of individuals, systems, devices, objects, etc., sequentially or simultaneously. Nonetheless, for the sake of simplicity, only a single person 103$p$ is illustrated in FIG. 1, and embodiments described herein may refer to use of the resource allocation management system 103 in connection with a single person merely for the sake of simplicity. Use of terms like "person" do not limit the applicability of the present disclosures to living beings, and such disclosures can be applicable to machines, objects, devices, etc. (e.g., autonomous or semi-autonomous vehicles).

Based on the data collected or determined by the resource allocation management system 103, the system 103 calculates the momentary buffer (or momentary buffer value). As described in further detail herein, in some embodiments the resource allocation management system 103 can be incorporated or embedded in, and/or communicatively coupled to, a monitoring system 101, which can manage and/or be managed based on the processing and results produced by the resource allocation management system 103. The resource allocation management system 103 and/or the monitoring system 101 are communicatively coupled, via a network 105, to various systems including a cloud 109 and systems 107-1, 107-2, . . . , 107-$n$ (collectively referred to as "systems 107"). As described in further detail herein, the resource allocation management system 103 and/or monitoring system 101 can collaborate with the systems 107 and cloud 109, for example, to provide enhanced central connectivity, sharing of data and other resources, and ultimately provide more efficient and effective resource allocation management.

More specifically, and still with reference to FIG. 1, although not illustrated in FIG. 1, the resource allocation management system 103 includes one or more processors, one or more memories, and/or one or more sensors that are communicatively coupled and configured to provide resource allocation management. In some embodiments, the one or more memories of the resource allocation management system 103 can store code or logic that can be executed by the one or more processors to perform the resource allocation management described herein. Alternatively or additionally, all or portions of the code or logic of the for providing resource allocation management can be stored and executed in or by memories, processors and/or other components of, in, or associated with (1) the cloud 109, and/or (2) the monitoring system 101, which are described in further detail below. Still further, the one or more memories can be operable to have data detected, determined, or otherwise received by the system 103 stored therein, such as data received about the user and subsequently analyzed by the system 103, such analysis provided in further detail below.

The sensors of the resource allocation management system 103 can include one or more cameras that are configured to capture visual allocation data of a person, using various techniques understood to those of skill in the art. It should be understood that the terms "visual allocation data" or "visual data" can refer to: (1) unprocessed (e.g., raw) data associated with one or more of the eye region of a person 103$p$ and a head of the person 103$p$ during a time period T; or (2) processed data, meaning information derived from the raw or unprocessed data. For example, the visual allocation data can refer to continuous video or periodic still images of the person 103$p$, which in some instances is captured by cameras that are part of, or in communication with, the resource allocation management system 103. While the person 103$p$ can be imaged from various angles and distances, the video and/or images include at least imaging of the eye or eye region of the person 103$p$, such that eye images or image sequences can be derived therefrom and/or imaging of the head of the person 103$p$, such that a direction in which the person 103$p$ is looking can be ascertained. In some embodiments, the visual allocation data can be pre-captured by another device and stored in an interconnected memory or the memory of the resource allocation management system 103. Moreover, as known to those of skill in the art, visual allocation data can be obtained or derived from data collected from sensors that measure, for example, eyelid movements, eye or face muscle movements, brain waves, thermal or acoustic imaging (or using other forms of energy), and the like. Additional information about visual allocation data, and systems and methods for managing the same, are provided for in U.S. patent application entitled "Systems and Methods for Providing Visual Allocation Management" of Delgado et al., filed on the same day as the present application, the content of which is incorporated by reference herein in its entirety.

The cameras of or otherwise in communication with the resource allocation management system 103 can be configured to capture visual allocation data (e.g., video, still images) continuously or as triggered by particular events or actions, as described in further detail below. The captured visual data can be stored in one or more memories (e.g., volatile or non-volatile), such as the memories of the resource allocation management system 103, and processed as described below to provide feedback, instructions, and/or other outputs related to the resource allocation of the person 103p and/or related systems, devices, objects, etc.

Still with reference to FIG. 1, the monitoring system 101 is a system, set of systems, infrastructure, object, or the like that includes, has embedded therein, or operates together with the resource allocation management system 103. While in FIG. 1 the monitoring system 101 and resource allocation management system 103 are shown as independent elements, it should be understood that in some embodiments the resource allocation management system 103 and the monitoring system 101 can refer to a single cohesive system or set of systems. Although the monitoring system 101 can be one of many varieties, in one exemplary embodiment described herein, the monitoring system 101 is a vehicle that includes the resource allocation management system 103. In such a scenario, for example, the resource allocation management system 103 can capture visual data (e.g., video, images) of the eye region and/or the head of the driver 103p during a time period T, determine the behavior of the individual 103p during the time period T based on the captured visual data, and output data (e.g., instructions, warnings, notifications, etc.) to the vehicle 101, the person 103p, or other component of the system (e.g. portable technologies and other systems in the ecosystem 100, whether illustrated or otherwise known as possible components or systems that can be provided in ecosystems of this nature). For example, the output data can be instructions to assume control or partial control of the vehicle 101. In some embodiments, the type or details of the output data can be based on pre-determined and/or pre-stored rules, thresholds, and the like. In this regard, the rules, thresholds, and the like can be stored in the memory or memories of the resource allocation management system 103 or any interconnected memories (e.g., in the cloud 109, in other connected devices and systems such as the smartphones, data loggers, etc.).

As illustrated, the monitoring system 101 includes one or more memories 101m and one or more components 101c. The memories 101m can be used by the monitoring system 101 to store its own data, rules, code, logic, and the like, including such data, rules, code, logic, and the like provided prior to operation of the system 101, as well as data, rules, code, logic, and the like received and/or derived as a result of operating the system 101, such as data received, rules and logic that are adjusted in view of data received, etc. For example, in the example mentioned above and described herein in which the monitoring system 101 is a vehicle, the data stored in the memories 101m can include information about the vehicle (e.g., fuel levels, oil levels, tire pressure, remaining battery capacity), information sensed or captured by the vehicle (e.g., temperature of different parts, outside temperature, speed, location), information relating to surrounding environment (e.g., objects, obstacles, other vehicles), and other data relating to a driver or passengers of the vehicle, time, trip, forecasts, and the like. It should be understood that these non-limiting examples are presented for illustration, and that a person of ordinary skill in the art will recognize other types of data that can be stored by the monitoring system 101, and other types of the monitoring system 101 other than the vehicle exemplary embodiment described herein.

In some embodiments, the data that is stored in the memories 101m of the system 101 is captured or obtained by, or associated with, the components 101c. The components 101c of the monitoring system 101 can be any objects, devices, parts, components or the like of, embedded in, attached, or tethered to the monitoring system 101, and/or that is operable to collect and/or transmit data. As one non-limiting example, the components 101c can include sensors. In the scenario described above in which the monitoring system 101 is a vehicle, the components 101c can be sensors such as road condition sensors, distance sensors, air pressure sensors, global positioning system (GPS), sensors, and others known to those of skill in the art. Moreover, in connection with the exemplary scenario in which the monitoring system 101 is a vehicle, the components 101 can include in-vehicle displays (e.g., an in-vehicle infotainment (IVI) center/system, entertainment center/system, an instrument panel/dashboard, etc.), and/or devices associated with or tethered to the vehicle (e.g., using Bluetooth, Wi-Fi, or the like) such as mobile devices, audio players, video players, screens, tablets, computers, and the like. In-vehicle displays can include digitally displayed and/or non-digitally displayed information. It should be understood that the components 101c can be or can include one or more processors.

The data stored in the memories 101m and/or captured, generated, or associated with the components 101c can be shared with or transmitted to the resource allocation management system 103 to provide enhanced context during the management of resource allocation described herein. As an illustrative example, freezing temperature and slick surface data obtained or sensed by the components 101c (e.g., sensors) of the system 101 can be transmitted to and/or used by the resource allocation management system 103, for example, such that the thresholds programmed to provide a particular output when a momentary buffer falls below a certain threshold may be adjusted. More specifically, if the monitoring system 103 required the system 101 to take over more control of the vehicle from the driver when the momentary buffer dropped below a level of 0.8 in normal road conditions, the monitoring system 103 may adjust the threshold level to be 1.4 in icy conditions such that the takeover command happens more quickly.

Still with reference to FIG. 1, as illustrated, the resource allocation management system 103 and monitoring system 101 can be connected to various systems 107 and a cloud 109 via the network 105. The network 105 can include one or more networks. Non-limiting examples of the network 105 include the Internet, a private area network (PAN), a local area network (LAN), a wide area network (WAN), an enterprise private network (EPN), a virtual private network (VPN), and the like. Such communications via the network 105 can be performed using a variety of wired and wireless techniques, standards and protocols, known to those of skill in the art, including Wi-Fi, Bluetooth, and cellular or satellite service. Moreover, in some embodiments, the systems 101, 103, 107, and 109, and/or their respective devices, components, parts, sensors, subsystems, etc. (e.g., components 101c) can communicate directly via, for example, short-range communication technologies and standards such as Bluetooth. To these ends, although not illustrated in FIG. 1, the systems 101, 103, 107, and 109, and/or their respective devices, components, parts, sensors, subsystems, include hardware (e.g., radio, antenna) and logic to enable the above-mentioned communications.

It should be understood that although a single cloud 109 is illustrated in FIG. 1, the ecosystem 100 can include multiple clouds, including public and private clouds, as well as other techniques for data transmission, storage, and/or retrieval, which are known to those skilled in the art. Reference to storage in the cloud 109 herein by no means limits the ability to store in other locations. Likewise, although only three systems 107-1, 107-2, and 107-*n* are illustrated, any number of systems can be communicatively coupled to the monitoring system 101 and/or the resource allocation management system 103.

The cloud 109 refers to an infrastructure made up of shared computing resources and data that is accessible to devices such as the resource allocation management system 101, the monitoring system 103, and/or the systems 107. The shared computing resources can include networks, servers, storage, applications, and services. A person of skill in the art will understand that any type of data and devices can be included in the cloud 109. Nonetheless, one illustrative example of contents of the cloud 109 includes visual data collected from connected systems 107 and stored in the cloud 109. Applications and services in the cloud 109 can be used to process the visual data, for instance, to derive information therefrom. In the exemplary scenario described above in which the system 101 is a vehicle, the cloud 109 can derive or identify therefrom, for example, potential dangers and/or visual allocation patterns of drivers of other vehicles (e.g., systems 107) within proximity of the vehicle 101. In some embodiments, data or logic used by the resource allocation management system 103 are stored in the cloud 109. For example, statistical models and rules used by the resource allocation management system 103 to output feedback, instructions, and the like, can be centrally stored in the cloud 109. By way of further example, data recorded or otherwise received by the system 103, as well as any output performed by any steps taken by the system 103 to analyze or otherwise use the received data, may also be centrally stored in the cloud 109. Additionally, or in lieu of, storage via the cloud 109, storage may occur in any other devices connected to the ecosystem 100, including but not limited to portable technologies like smartphones and tablets, data loggers, and the like.

The systems 107 can include virtually any system, device, object, person, infrastructure, or the like that can collect and/or communicate data, for example, with the resource allocation management system 103. For instance, the systems 107 can include: a house having a number of interconnected devices (e.g., refrigerator, television, heating and cooling system) and objects (e.g., doors, windows, security system) equipped with sensors; a factory made up of machinery equipped with sensors; a person equipped with mobile devices, implantable devices, wearable devices, and the like. A person of skill in the art will recognize other types of systems 107. Nonetheless, the systems 107 can provide data to or for the resource allocation management system 103 to perform more contextualized resource allocation management, and the resource allocation management system can output data or instructions to the systems 107, for example, based on the resource allocation management processing performed by the system 103.

As described in one example above, the systems 107 can include surrounding vehicles that are interconnected with the system/vehicle 101. The surrounding vehicles 107 can share their own sensed or gathered information with the vehicle 101, and vice-versa. In some embodiments, the vehicle 101 can transmit instructions and/or other data output from the resource allocation management system 103 to the surrounding vehicles 107, for example, to alert the drivers of the surrounding vehicles 107 and/or to instruct the surrounding vehicles 107 to maneuver or function in a certain manner (e.g., turn on headlights, reduce speed, stop, return to center of lane), in light of resource allocation management results calculated or determined by the resource allocation management system 103.

Example embodiments in which an ecosystem 100 includes a resource allocation system 103 used in a vehicle 101 to identify a driver's awareness or attention, continuously calculate and output a level of SA as the driver operates the vehicle, and interface with vehicle systems to aid in driver safety are described in detail below, in connection with FIGS. 2 to 6. It should be understood, however, that the ecosystem 100 and systems therein can be configured for and/or used in a variety of contexts. Non-limiting exemplary applications of the resource allocation management system 103 include:

Insurance Companies—to evaluate a specific operator's attention level as a measure of risk in determining insurance credits and/or to evaluate a certain population's (e.g., particular age, particular experience level) attention level for establishing baseline expectations for that certain population;

Fleet Management—to monitor vehicle operators' performance, both as individuals and across a fleet (delivery vehicles, transportation systems like buses or trains, etc.), to optimize fleet safety or award safety related bonuses;

Retail—to identify patterns of consumer attention while shopping, and to improve or augment interactive interface displays to draw consumers' attention back on-target;

Car-to-Car Networks—to upload resource allocation data from one car to a cloud network such that other cars can access the information and the car and/or the driver can take into account awareness of vehicles around them;

Actuarial Science—to improve accuracy and detail of risk and uncertainty evaluations;

Accident Reconstruction—to evaluate the level of awareness of those involved in an accident, among other factors that can be determined in view of the present disclosures; and Law Enforcement—to identify common attention patterns across drivers and take positive measures to address concerns, such as adjusting speed limits, signage, or patrol cover, and/or to evaluate a particular operator's attention at a particular time.

Vehicle Equipped with Resource Allocation Management System

As explained above, the resource allocation management system 103 can be incorporated in many objects that can serve as the monitoring system 101. Such objects can benefit from classifying different levels of behavior, attention, and/or awareness, allowing the monitoring system 101 to make adjustments itself, or inform other components and/or people about actions that can be performed to make desirable adjustments in view of the results recorded and/or otherwise determined by the resource allocation management system 103. A vehicle is one non-limiting example of an object that benefits from the awareness monitoring systems and methods provided for in the present disclosure. As described in greater detail below, a resource allocation system incorporated into a vehicle can allow the system to provide instructions to the vehicle itself, the driver or operator of the vehicle, and/or other devices or other components interconnected or otherwise in communication with the vehicle and/or the resource allocation management system to improve performance of the same (e.g., smartphones data loggers, etc.).

Figure 2:
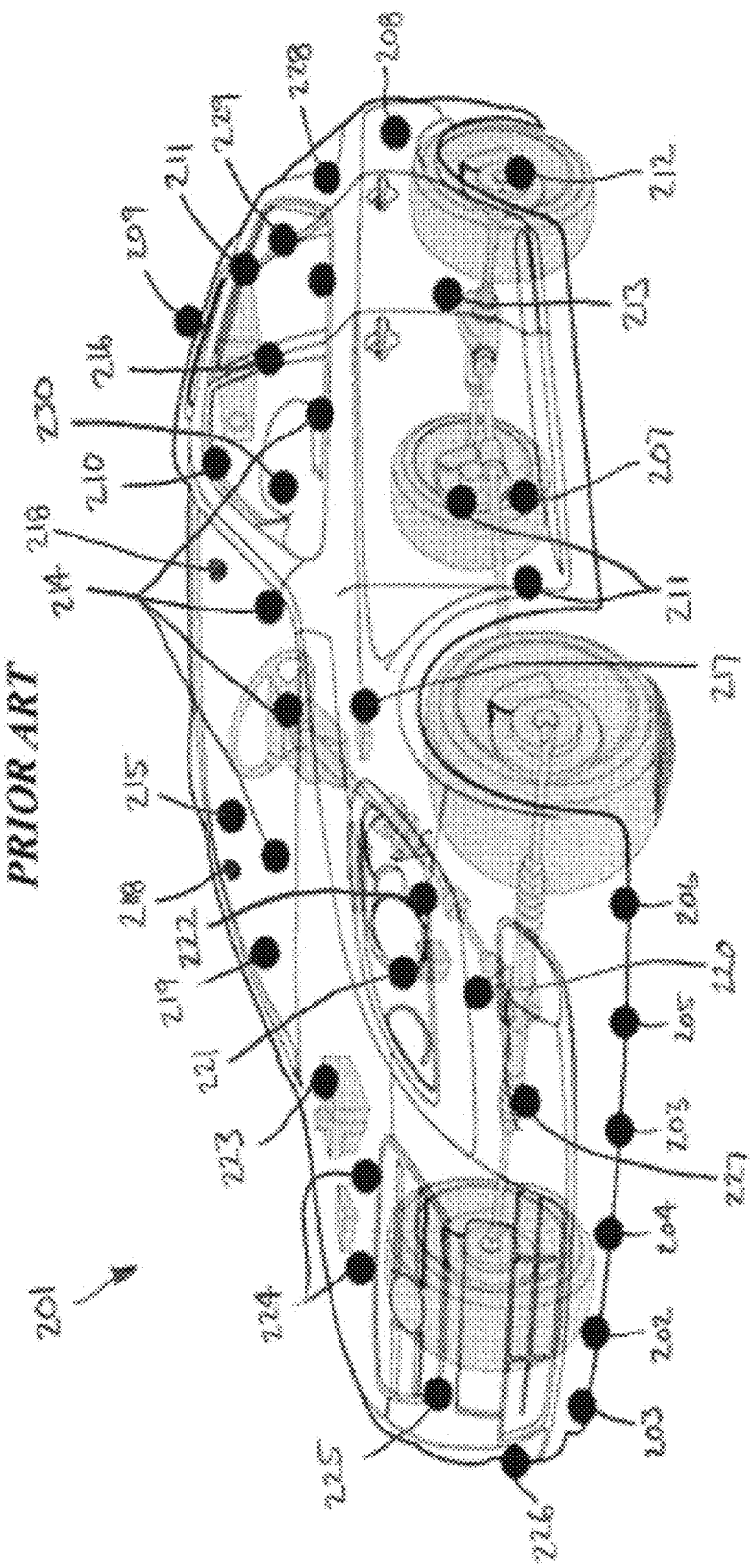
FIG. 2 is a schematic, perspective view of one exemplary embodiment of a vehicle for purposes of illustrating a non-limiting, plurality of locations at which sensors may be disposed with respect to a vehicle.

FIG. 2 provides a non-limiting illustration of the types of sensors and other monitoring components that can be included in a vehicle 201. The awareness of and afforded by these sensors and other components help improve the overall awareness of the vehicle 201, its operator, and other devices or components connected to the ecosystem (e.g., ecosystem 100). Other components connected to the ecosystem can include other monitoring systems associated with the vehicle 100, other vehicles (e.g., vehicles in the surrounding area, vehicles of a similar type, vehicles in a certain database), and global databases, where global can, but does not necessarily, mean across the world, and can include a more particular region, such as a surrounding environment of the vehicle, a region in which the vehicle is operated (e.g., city, state, territory, country, region in which an insurance provider provides coverage, etc.).

Some sensors and other monitoring components can be operated to detect an outside environment and how the vehicle 201 reacts to it. They include: a road condition sensor 202, magnetic sensors 203, a vehicle distance sensor 204, a forward obstacle sensor 205, a blind spot monitoring camera 206, a side obstacle sensor 207, a rear obstacle sensor 208, a road-to-vehicle/vehicle-to-vehicle communication system 209, and a rear view camera 210. Other sensors and monitoring components can be operated to monitor or control what happens on and/or within a vehicle. They include: drive recorders 211, an air pressure sensor 212, an inside door lock/unlock 213, airbags 214, a water repelling windshield 215, a seatbelt pretensioner 216, a driver monitoring sensor 217, one or cameras 218 to monitor a driver, a head-up display 219, a steering angle sensor 220, an electronic control throttle 221, an electronic control brake 222, a fire detection sensor 223, vehicle speed and acceleration sensors 224, a collision detection sensor 225, a pedestrian collision injury reduction structure 226, and electronic control steering 227.

Still further, other sensors and monitoring components can be operated to communicate information, which in turn can allow the vehicle 201 to react to it and/or other vehicles and components to react to the communicated information. They include: a Global Positioning System (GPS) sensor 228, a message display system 229, and a hands-free system 230. The labeled sensors and other monitoring components are by no means limiting, and a person skilled in the art will understand a plethora of other sensors and other monitoring components that can be incorporated with the vehicle 201 to sense and monitor an outside environment, the vehicle 201, and/or to communicate information between the vehicle 201 and other components of an ecosystem (e.g., the ecosystem 100). Further, a person skilled in the art will recognize that at least some of the identified sensors and monitoring components can perform multiple of these functions, including sensing the data and communicating that information, whether to other components of the vehicle 201 or to any other components of the ecosystem. Still further, to the extent the illustrated embodiment labeled a single sensor or other monitoring component, there may be multiple sensors or monitoring components of that type, and likewise, to the extent the illustrated embodiment labeled multiple sensors or other monitoring components, there may be instances in which only a single sensor or other monitoring component is provided.

Figure 3:
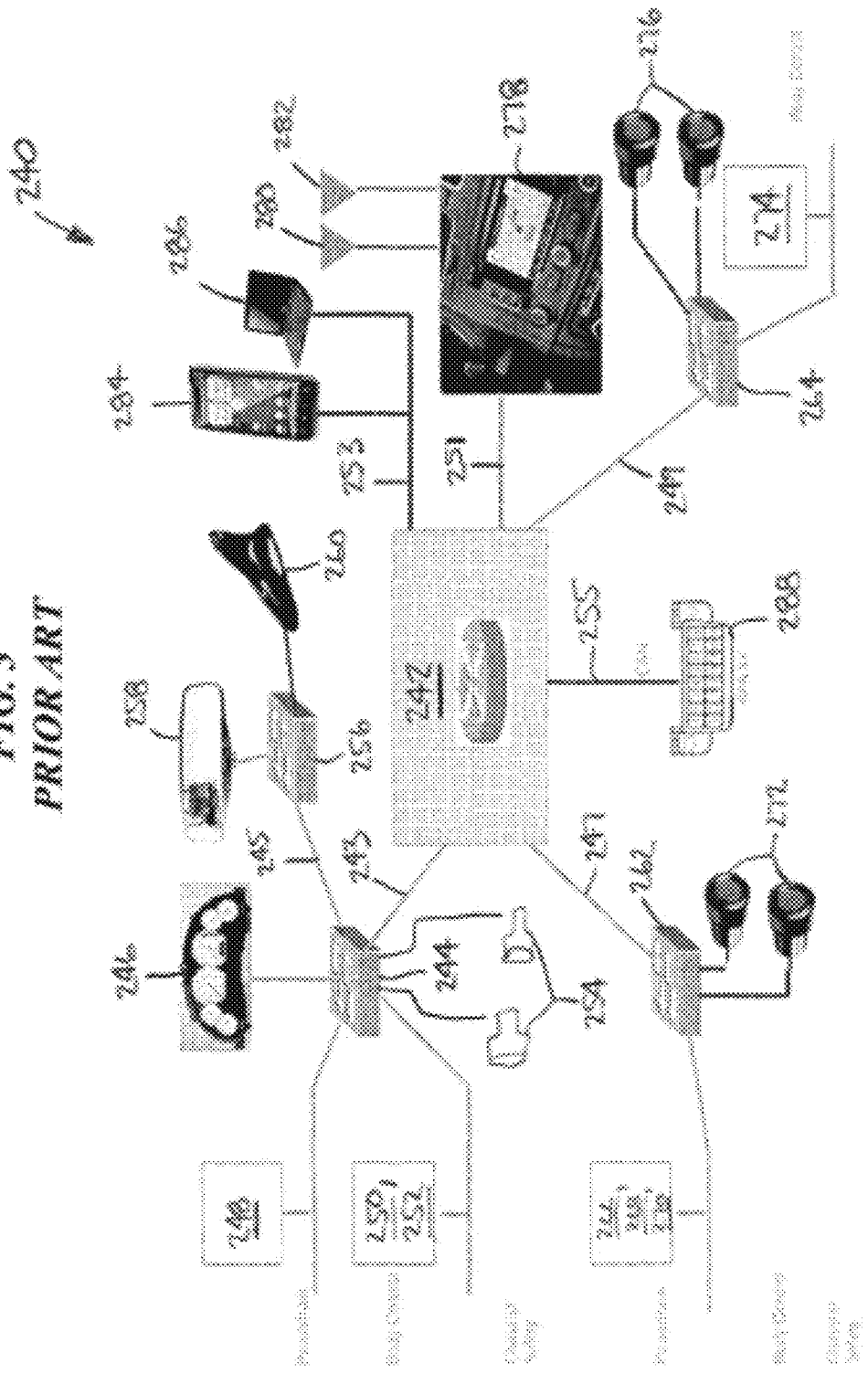
FIG. 3 is a schematic diagram of one exemplary embodiment of a vehicle communication network.

There are many ways by which the data or information sensed, recorded, or otherwise received by the sensors and other monitoring components of the vehicle 201 can be communicated amongst each other and/or to other locations (e.g., the cloud, other databases, other vehicles, etc.). Any means of data transmission can be used. FIG. 3 provides for one exemplary, non-limiting embodiment of a vehicle network 240 in which the vehicle 201 (not illustrated) includes an electronic control unit (ECU) 242 that allows the various systems within the vehicle 201 to communicate with each other and with an outside environment (e.g., the ecosystem 100). Electronic control units can include components such as a core (e.g., a microcontroller, etc.), one or more memories (e.g., static random access memory (SRAM), electrically erasable programmable read-only memory (EEPROM), flash, etc.), one or more inputs (e.g., supply voltage, digital inputs, analog inputs, etc.), one or more outputs (e.g., relay drivers, H bridge drivers, injector drivers, logic outputs, etc.), and communication links.

Some exemplary inputs are illustrated in FIG. 3. As shown, a first mini-switch or hub 244 can receive information from components such as an instrument cluster 246, a powertrain module 248, body control module 250, a chassis and/or safety module 252, one or more driver-facing video cameras 254, and a second mini-switch or hub 256, which itself can receive information from components such as a rear view mirror 258 and a telemetry module 260. In the illustrated embodiment, the body control module 250 and the chassis and/or safety module 252 are combined into a single module. The telemetry module 260, like other components provided for herein, can communicate within and outside of the vehicle by way of any known means for communication, such as Wi-Fi, Bluetooth, a cellular network, GPS, dedicated short-range communications (DSRC), etc. With respect to the driver-facing video cameras 254 that monitor the driver, such monitoring can be done by any known techniques for measuring eye and head movement, including but not limited to tracking eye movements, micro-movements of the eye, head movements, and other means of measurement provided for herein or otherwise known to those skilled in the art. Where visual data is measured, the visual data can be obtained by capturing video or images of the person during their engagement in the activity (e.g., driving) using sensors of the resource allocation management system, such as the cameras 254. The visual data can include at least an eye image sequence of the person while engaged in the activity. Visual features, such as pupil position, and/or based on facial features, thermal or acoustic imaging, etc., can be extracted from the visual data and, in turn, used to calculate glance information throughout the engagement of the person in the activity. Glance information can include glance direction (e.g., what the person is looking at, or the direction or region that the person is looking at, at a given time), glance duration (e.g., how long the person is looking in the glance direction at the given time), glance transitions (e.g., when the person moves from looking in one direction to looking in another direction), and/or head position or pose. Each glance in the visual data is classified according at least to its direction or spatial region. Further, as known to those of skill in the art, the cameras of the resource allocation management system 103 can be positioned in different areas of the vehicle (e.g., dashboard, console, rear view mirror, side mirrors, etc.) such that the driver's eye region (e.g., one or two eyes, open or closed eyes, eye area when driver is wearing sunglasses) is visible and able to be captured from a variety of angles. For example, the cameras can be positioned to capture the driver's entire head and upper torso with sufficient margins to allow the head or face to remain in view while the driver performs normal or anticipated types of movements.

The first hub 244 can transmit information it receives to the ECU 242 by any known means for communication as well, and in the illustrated embodiment it does so by way of Ethernet 243. In the illustrated embodiment, the second hub 256 transmits information it receives via Ethernet 245 as well, although other means of communication can be used, and further, in alternative embodiments, the second hub 256 can be configured to communicate directly to the ECU 242 rather than to the first hub 244.

Each of a third mini-switch or hub 262 and a fourth mini-switch or hub 264 can likewise receive information from other components of the vehicle. As shown, the third hub 262 receives from a second powertrain module 266, a second body control module 268, a second chassis and/or safety module 270, and one or more front video cameras 272, and the fourth hub 264 receives information from a third body control module 274 and one or more rear video cameras 276. In the illustrated embodiment, the second powertrain module 266, the second body control module 268, and the second chassis and/or safety module 270 are combined into a single module. While the third and fourth hubs 262 and 264 can likewise transmit information they receive to the ECU 242 by any known means for communication, in the illustrated embodiment each does so by way of Ethernet 247 and 249, respectively.

Further, an IVI center/system 278, also referred to as an infotainment center/system, entertainment center/system, or center stack, among other names known to those skilled in the art, can also communicate with the ECU 242. The IVI center/system 278, as well as other components of the present disclosure, such as the instrument cluster 246, may more generally be referred to as in-vehicle displays, which encompass any components that displays information to a user related to the user's operation of the vehicle. Accordingly, in some instances, in-vehicle displays can be provided by outside objects, such as smartphones and the like. In the illustrated embodiment, the IVI center/system 278 communicates with the ECU 242 directly via Ethernet 251, although in other embodiments it can be run through a mini-switch or hub, for example, and/or by other means of communication known to those skilled in the art. As shown, the IVI system 278 can communicate outside of the vehicle 201 as well, to another portion of the ecosystem for example, using components such as GPS 280, satellite 282, antenna (not shown) or other means of communication. Some exemplary IVI systems include but are not limited to: Ford SYNC, Ford MyFordTouch, Audi Multi-Media Interface, BMW iDrive, Lexus Remote Touch, Mercedes-Benz Command APS, Toyota Entune, Kia Motors UVO, Cadillac CUE, Chevrolet MyLink, Hyundai Blue Link, Fiat Chrysler Uconnect, and Fiat Chrysler Blue&Me. In some embodiments, the IVI center 278 can use the telemetry module 260 to communicate outside of the environment of the vehicle 201 and/or can communicate through other in-vehicle displays (e.g., the instrument cluster 246, speakers, microphones, etc.).

Still further, additional information can be provided to, and/or by, the ECU 242 by way of one or more additional devices. In the illustrated embodiment the additional devices are shown as a smartphone 284 and a computer 286, which can be communicatively coupled (e.g., tethered) to the ECU 242 by way of a link 253 to communicate with the vehicle 201 and the components illustrated in FIG. 3 or otherwise provided for herein or known to those skilled in the art. The link 253 can be achieved using many different means of communication, including but not limited to Universal Serial Bus (USB), Wi-Fi, and Bluetooth. The additional devices can often be devices provided by the operator of the vehicle 201, although in some instances the devices may be provided by a third party, such as a passenger of the vehicle 201, another person near the vehicle 201, the manufacturer or other supplier of the vehicle or its components, and/or another component of the ecosystem or vehicle 201.

As shown, the ECU 242 can be generally associated with the vehicle 201 by way of a data link connector 288 (e.g., OBD DLC Connector), including is associated wiring 255. The data link connector 288 can be a multi-pin diagnostic connector port that allows the ECU to be powered by the vehicle 201. It can include a vehicle scan tool to interface with the identified components or control modules tied to the ECU 242, and can access on-board diagnostics and live data streams, among other information. The scan tool associated with the data link connector 288 can be used, for example, to diagnose and/or reprogram the various modules associated with the ECU 242.

A person skilled in the art will understand how the various modules and components associated with the vehicle network 240 operate, and thus detailed explanations of the particular modules and components is unnecessary. By way of example, a person skilled in the art will understand the various information that can be provided by and/or monitored by the instrument cluster 246 without detailing how a speedometer, an odometer, a fuel measuring gauge, and their related components, sensors, etc., operate.

Figure 4:
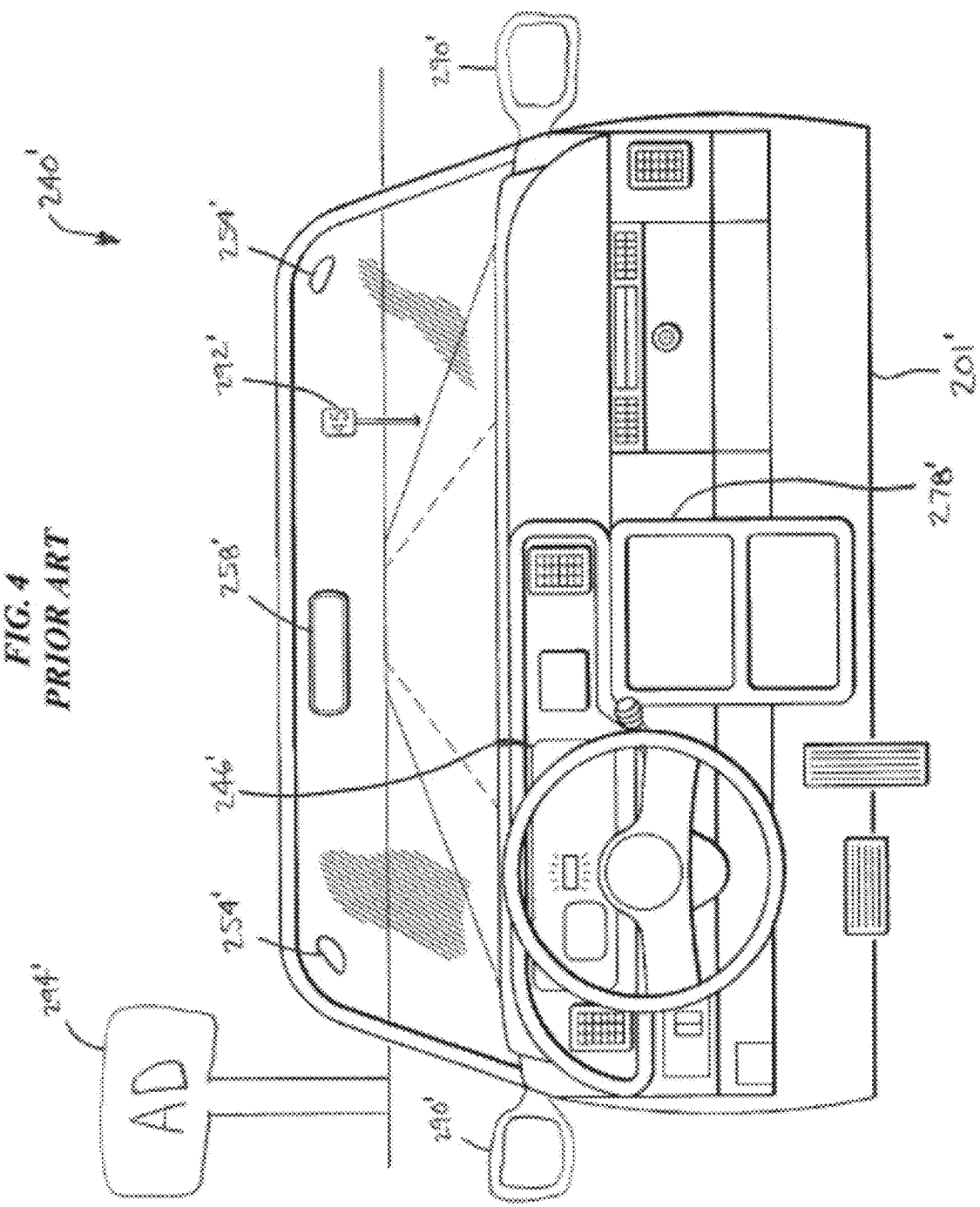
FIG. 4 is a schematic illustration of a view of a portion of an interior cab of a vehicle and a portion of an environment outside of the vehicle when viewed from the interior cab, the vehicle being one in which resource allocation management systems and methods as provided for herein can be incorporated.

FIG. 4 illustrates some aspects of a resource allocation management system, e.g. the resource allocation management system 103, provided for in conjunction with a vehicle 201'. As shown, the vehicle 201' includes in-vehicle displays such as an instrument cluster 246' and an IVI center 278', as well as a rear view mirror 258', side view mirrors 290', and two driver-facing cameras 254', each of which can be used to assist in monitoring the vehicle 201' and its operator during operation of the vehicle 201'. A person skilled in the art will understand how these various components and modules, and other components and modules not specifically labeled or illustrated in FIG. 4 but known by those skilled in the art as components and modules that can provide additional information to a vehicle network 240' that includes the vehicle 201', can be operated. These components and modules include, but are not limited to, the types described with respect to FIG. 3. By way of non-limiting example, the two driver-facing cameras 254' can be operated to detect glance frequency, locations, and durations of the driver, and a processor associated therewith can be operable to analyze such locations in accordance with the disclosures provided for herein. Further, although in the illustrated embodiment there are two driver-facing cameras 254', a person skilled in the art will recognize many other camera configurations can be used to monitor a driver, such as a single camera associated with the rear view mirror 258', and any number of cameras can be used. Still further, in some embodiments, whether cameras are included or not, other tools, devices, components, etc. can be used to monitor a driver. By way of non-limiting examples, sensors embedded or otherwise associated with the body (e.g., near or on the eye) and/or devices used to monitor brain waves and/or other neuro functions and pathways to determine information about the driver, such as where the driver is looking, for how long, how aware the driver is of outside objects, if the driver is paying attention to what he or she is looking at, etc.

Also shown in FIG. 4 are various places where a glance may be located, some of which are informative and/or helpful to the operation of the vehicle by the vehicle operator, and others which are not helpful. For example, each of a speed limit sign 292' and an advertisement billboard 294' that includes information about upcoming traffic issues can be subject to a peripheral road glance (described in greater detail below) that may be considered informative to the SA of the driver, while a view to a cellular telephone to check a text message can be subject to an off-road glance that may not be considered informative to the SA of the driver. Further, in some embodiments, because not all signs and billboards provide SA-relevant information, a system can know which signs 292' and advertisement billboards 294' provide SA-relevant information and SA-irrelevant information. Such information can be provided, for example, by one or more databases in which signs and billboards are identified or tagged as providing SA-relevant and SA-irrelevant information. Accordingly, in some instances, peripheral road glances can be further classified into SA-relevant and SA-irrelevant information. As provided for herein, the type of off-road glance can impact how the resource allocation management system 103 processes the glance and operates the provided for buffer algorithm. Likewise, the duration of on-road glances can impact how the resource allocation management system 103 processes the glance and operates the provided for buffer algorithm. FIG. 4 helps provide context to what are described herein as on-road and off-road glances.

Attention Buffer

As discussed with respect to FIGS. 1-4, in some preferred embodiments, the disclosures provided for herein can be applied to vehicles to assess the resource allocation of the vehicle and/or the driver as the driver interacts with the managed system. The system can include the vehicle and its related components, modules, etc., as well as various outside influences, such as other vehicles near the vehicle, the road conditions, and other factors not directly associated with the vehicle and its operator, also referred to as contextual data. Non-limiting types of contextual data include environment data (e.g., weather, road conditions) regarding the environment in which the vehicle is located, surrounding data (e.g., information regarding nearby vehicles, obstacles, structures, roads, and the like) regarding the surroundings of the vehicle 301 within a given radius, and user data (e.g., age, gender, heart rate, body temperature, derived driving habits of the user based on previously entered/received data) regarding the driver of the vehicle. Nevertheless, one skilled in the art will recognize that the present disclosures are not limited to application in conjunction with driving a vehicle, but rather, the disclosures can be used in a variety of fields to assess an individual's attention across time in a dynamically changing environment. By way of non-limiting example, the systems and methods set forth herein can be used in the context of driving, walking, piloting an airplane, and/or operating heavy machinery, as well as with respect to various data management and analysis platforms (e.g., determining insurance credits and making other insurance-related determinations, managing vehicle fleets, monitoring consumer attention with respect to retail, determinations made in actuarial science, accident reconstruction, and law enforcement). Notably, not all of the provided for uses relate to operating a vehicle, as the ability to assess attention across time in a dynamically changing environment is by no means limited to vehicle operation.

Figure 5:
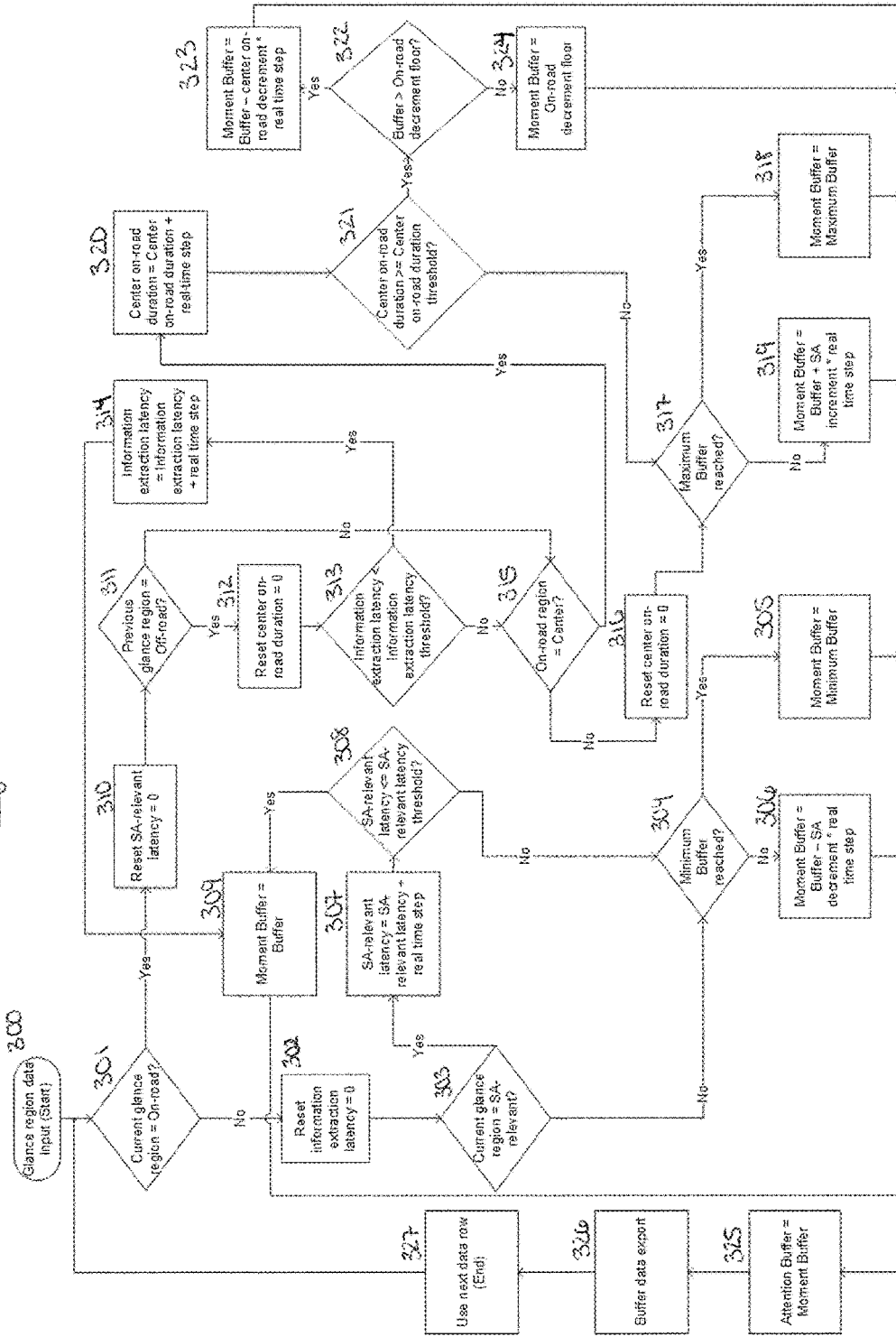
FIG. 5 depicts a flowchart representation of one exemplary embodiment of an attention buffer algorithm as provided for herein.

The systems and methods provided for in the present disclosure relate to the implementation of an attention buffer in a monitoring system (e.g., the monitoring system 103 of FIG. 1). FIG. 5 illustrates one exemplary implementation of the attention buffer. Before digging into the various steps and action items illustrated in the figure, however, it is helpful to have a baseline understanding of various terminology used in conjunction with the disclosed attention buffer.

Terminology Associated with the Attention Buffer

An attention buffer refers to the continuously changing range of values that represent and correspond to an awareness or situation information level of a user of the managed system. The momentary buffer value is the instantaneous discrete value of the attention buffer that is calculated by the attention buffer algorithm in response to an input (e.g., an inputted glance). The attention buffer can store each calculated momentary buffer value such that the attention buffer comprises a continuous timeline of measurements. As used in FIG. 5, the term "Buffer" refers to the current value of the attention buffer as the process works through the attention buffer algorithm. This Buffer value may also be referred to as an initially-determined momentary buffer, among other terms determinable in view of the present disclosure, because prior to any adjustments made by the processor to the momentary buffer, the current value of the attention buffer is equal to the initially-determined momentary buffer held over from the previous attention buffer algorithm iteration.

When the attention buffer is used in a vehicle application, an "on-target" glance is "on-road" while an "off-target" glance is "off-road." As provided for herein though, more nuanced analysis of such glances can be determined, qualifying some off-target/off-road glances as being more beneficial for SA than some other off-target/off-road glances, and likewise qualifying some on-target/on-road glances as being less beneficial for SA than some other on-target/on-road glances. By way of example, in the context of driving, "on-road" glances can be divided into categories such as "forward," "left-forward" (and/or "peripheral-left"), and "right-forward" (and/or "peripheral right"), thereby allowing the system to know which on-road glances are considered "center road," and "off-road" glances can be divided into categories such as "center stack" (e.g., an IVI system or other in-vehicle displays), "instrument cluster" (which in some cases can be part of a center stack and/or an in-vehicle display), "interior object," "cell phone," "left mirror," "left window," "rearview mirror," "right mirror," "right window," and "passenger." A person skilled in the art will understand other categories that can be used to qualify "on-road"/"on-target" glances and "off-road"/"off-target" glances in view of the present disclosures, including but not limited to further delineating between relevant and irrelevant glances that are considered "on-road."

Because the attention buffer quantifies a user's attention or awareness level over a continuous period of time, the moment-to-moment value can be used to inform some sort of action. Some exemplary actions that occur in response to the momentary buffer value are described above and further below, with the decision about whether to take or not take a particular action being driven, at least in part, by a threshold value. That is, if the momentary buffer value meets and/or exceeds a threshold value, no action may be taken, whereas if the momentary buffer value falls below the threshold value, then action may be taken. Of course, other variations exist, such as the action occurring if a threshold value is exceeded and/or if the threshold value is met.

Where thresholds are employed as an evaluative measure, the threshold can be normative based upon a population and/or individual characteristics. For example, a preexisting data set may exist amongst a population to determine the relevant threshold for a particular awareness level. The population may be the entire relevant population (e.g., all drivers), or a subset thereof (e.g., all drivers between 16 and 22 years of age and driving in a city having a population of 800,000 or more). Alternatively, or additionally, the thresholds may be tailored based on the specific user, i.e., the user's "individual characteristics." Such data may be input ahead of time and/or may be developed over time, for instance by collecting data in conjunction with use of the resource allocation management systems provided for in the present disclosure. Similarly, thresholds based on the population data can be dynamic such that as additional data is inputted in conjunction with use of the present resource allocation management system or otherwise, the thresholds may adjust. More particularly, the threshold can be tailored through learning algorithms to an individual and/or across a population. Artificial intelligence components of the resource allocation management system 103, or otherwise located and in communication with the resource allocation management system 103, can be used to adjust the attention buffer and/or the thresholds based on learned information, for example, information learned about a user and/or an environment impacting the user.

The threshold may be implemented as fixed limits, variable limits, or adaptive limits. More particularly, fixed limits may include instances in which the threshold stays the same, regardless of data generated by the system or otherwise. As discussed below, in some instances, a value of the attention buffer can have a fixed range between 0 and 2. Variable limits, on the other hand, may include instances in which the threshold changes based on certain conditions. For example, if road conditions change to be more slippery than normal, a threshold value may change to account for more slipper roads. Fixed or variable ranges may also be set or adjusted based on the level of automation with which a vehicle is operated. Still further, adaptive limits are those that allow for the thresholds to change in view of additional data provided about the user, whether through data entry about the user and/or through data entered by virtue of using the resource allocation management system.

The real-time step refers to the time increment between received glance data, calculated using a time stamp associated with each input. As described above, real-time includes "near real-time."

In the attention buffer, SA Decay, or SA Decrement, is the rate of decrement or loss of SA that occurs when glances are made off-target. Optimally, the SA Decay is tailored to reflect the uncertainty with respect to changes in the driving scene that arise during an off-road glance to a non-SA relevant region or an extended SA-relevant region glance. This is tied to the rate at which information in the scene changes during a glance away, which can be impacted by factors such as complexity of the road scene, travel speed, and roadway curvature. By way of non-limiting example, SA Decay may be approximately in the range of about 0.2 units per second to about 8.0 units per second. This range of values is a function of the projected amount of time before a vehicle leaves a lane (or a road) due to changes in the scene during an off-target glance under various circumstances (e.g., speed). The SA Decay may be adjusted from a default scalar value to a function of multiple variables accounting for specific glance features or other contextual factors. Additional factors may include, but are not limited to, parameters associated with vehicle control, biometrics of the driver, and/or the operating environment. Furthermore, the SA decrement rate for any given situation may be adjusted to account for user familiarity with the specific environment in which the user is operating. Optimal values of SA Decay may be identified by a person skilled in the art through desktop, simulator, and/or on-road studies assessing the length of off-road glance time before information about the roadway needed to maintain position within the lane is lost, which can be dependent on experimental variables such as traveling speed, roadway/environmental complexity, road curvature, and cognitive memory load.

The SA Gain, or SA Increment, is the rate of increment for restoring the attention buffer as a function of the length of an on-road glance. The SA Gain is set to a default rate that preferably reflects the SA the driver develops as a result of an on-target glance. By way of non-limiting example, SA Gain may be approximately in the range of about 0.1 units per second to about 3.0 units per second. SA Increment may be determined by a person skilled in the art through desktop, simulator, and/or on-road studies assessing the length of on-road glance time needed to perceive and comprehend the presence of potential hazards. The SA Gain may be adjusted from default to account for specific on-road glance features. For example, the SA Gain rate may be a function of the location to which a glance is directed on the road as the region of an on-road glance meaningfully impacts the driver's ability to perceive and comprehend potential hazards. Furthermore, SA Gain may be a set scalar value, an algorithm or a function. Non-limiting examples of factors that may impact the SA increment rate include the information density of a scene (e.g., highway/interstate vs. deep urban setting), a degree of ambiguity surrounding scene events (e.g., merging lanes, lane closures, detours), and a degree to which surrounding traffic behaves in an expected way. Typically, the rate of SA Gain is less than the rate of SA Decrement because the loss of SA typically occurs more quickly than the gain of SA. With that said, in some instances, the differences may be negligible or even non-existent, for instance in some situations in which the driver is already very familiar with the surrounding environment.

A latency period refers to a delay period between the classification of a glance or a glance's relevant features and the corresponding adjustment of the attention buffer value. Latency periods are imposed when an off-road glance is to an SA-relevant region, referred to herein as SA-relevant latency, when a glance transitions from an off-road region to an on-road region, referred to herein as a transition or information extraction latency, and for an initial period of continuous center on-road glance. These latency periods are a function of where a glance is placed and the location's implications in maintaining, increasing, or decreasing awareness of the scene. A glance to an SA-relevant region provides useful information with respect to SA and thus delays the decay of roadway or environment information retained by the user. When a user's glance is to the center on-road region, the user advantageously gains SA information up until a certain point when a forward center glance becomes detrimental at the expense of peripheral awareness. Thus, the center on-road latency period delays a decrement of the buffer until after a center on-road glance time exceeds a threshold value. In contrast, a transition from off-road to on-road results in a delay to the user's increase in SA gained from the on-road glance due to the time it takes a user to reconstruct a mental representation or understanding of the on-road scene.

As shown in detail in FIG. 5, and further described below, latency periods are evaluated by the algorithm using a specific counter variable for each latency period. An SA-relevant latency counter tracks the SA-relevant latency period; an information extraction latency counter tracks the transition delay, also referred to as the perception delay; and the Center On-Road Duration counter tracks the center on-road latency period. Each counter operates in a similar manner, with the value of the counter incrementally increased by a real-time step when specifically instructed by the algorithm. This can be seen, for example, in FIG. 5 at step 320 when the center on-road duration counter is set to the prior center on-road duration value plus the real-time set. Each counter holds its value until the counter is either incremented or reset to zero, for example, when the center on-road duration counter is reset to zero at steps 312 and 316. One having ordinary skill in the art will recognize a cumulative counter is but one method known in the art to calculate a period of time. For example, in some embodiments the attention buffer algorithm may compare timestamps for inputs received which represent a full duration of a continuous glance to a single region. Thus, using the timestamp associated with each glance location the attention buffer may determine a time of the glance and compare that to an appropriate threshold in the process of calculating a momentary buffer.

The Attention Buffer Algorithm

FIG. 5 shows a schematic representation of an embodiment of the attention buffer program employed in a vehicle. The algorithm is performed by a one or more processors of the resource allocation management system (e.g., the system 103), in communication with the components of the vehicle system, to continuously calculate a momentary buffer value of the attention buffer. As described in detail below, the attention buffer value is tied to processes of attention and memory which impact how drivers sample information to form, retain, and update their robust representation of the surrounding environment. In the vehicle application, the managed system comprises the vehicle and in-vehicle components, as well as the road and outside driving environment. The resource allocation management systems and methods of the present disclosure may receive inputs from at least one of: (1) one or more vehicle components and/or sensors (see, e.g., the descriptions and illustrations related to FIGS. 2-4; (2) the user and/or sensors, cameras, and the like being used to monitor one or more physiological or other traits of the user, whether already known/entered or derived during use (e.g., age, gender, heart rate, body temperature, derived driving habits of the user based on previously entered/received data); and (3) environment data (e.g., weather, road conditions) regarding the environment in which the vehicle is located and/or surrounding data (e.g., information regarding nearby vehicles, obstacles, structures, roads, and the like) regarding the surroundings of the vehicle within a given radius, the last two being referred to herein as contextual data.

Likewise, the resource allocation management systems and methods of the present disclosure may output attention data to at least one vehicle component (e.g., at least one memory associated with the resource allocation management system and/or the vehicle more generally) and/or to a database and/or receiver, external or internal to the managed system, capable of receiving information. As used herein, a database includes, but is not limited to, an object capable of receiving data, such as a third party database, a data logger, the cloud, a smart device (e.g., a smartphone), and other after-market devices and the like that exist for data storage. Smart devices can encompass any electronic device capable of communication and connectivity to other devices or networks via different known protocols such as Bluetooth, Wi-Fi, 3G, NFC, etc., including but not limited to smartphones, tablets, computers, smartwatches, and smart cars. In some embodiments, the at least one vehicle component, database, and/or receiver may include a profile-determining processor, which can be a processor configured to create and/or define an operator-specific profile based on the received attention data (e.g., the moment-to-moment buffers). Alternatively, or additionally, the profile-determining processor can be configured to make a global profile, which can be created and/or defined using broader population assessments based on metrics such as the mean, mode, minimum, maximum, variability, or moving average window of the attention buffer, related standard deviations, distribution summaries (e.g., use of certain percentile values, such as a $75^{th}$ percentile for mean and standard deviation cutoffs to parse out meaningful differences between user groups), moment-to-moment aggregate plots, advanced metrics that can be produced by Fourier analysis of spectral width and power and the like, Symbolic Aggregate Approximation techniques, and other statistical data or metrics that are derivable in view of the present disclosure and knowledge of those skilled in the art.

The attention buffer system may continuously output the calculated momentary buffer, or other statistical metric or representation of either the momentary buffer or the attention buffer over time, to one or more "smart," artificially intelligent, and/or adaptive in-vehicle components or systems, as well as a host of out-of-vehicle locations, such as those described in the previous paragraph and elsewhere herein. The components or systems may then use the attention buffer program output to assist with safe driving. For example, in response to the attention buffer program output(s), in-vehicle components or systems may adapt to increase the level of automation, take over the driving task without the drivers consent, decrease the level of automated functions, block nuisance alarms, limit incoming data to the vehicle, disable or enable functionality, trigger alarms or alerts, or augment an exchange of information with at least one of the vehicle and the operator of the vehicle.

The process begins at step 300 with the resource allocation management system receiving input data from one or more glance-measuring devices, such as driver-facing video cameras 254'. The system receives a distinct input variable or variables for each glance. The input glance data can include, for example, at least a time stamp and a glance region marker. By way of non-limiting example, the input may further include frequency, duration, and location of a glance, pupil coordinates, and/or head position or pose, among other information. The attention buffer program may also receive as inputs metrics relating to vehicle control, vehicle automation level, display changes, presence of a passenger, user biometrics, and/or an operating environment. Input glance data may be received at a regular time interval, for example a system operating at 10 Hz receives input glance data approximately every 10 milliseconds (e.g., at 10 Hz, a 1.0 second glance would result in 10 rows of input data, and a 2.5 second glance would result in 25 rows of input data), with each row of data representing an equal increment of time within the total duration for each glance. Alternatively, software may pre-screen video received from cameras (e.g., the cameras 254') and transmit data to the attention buffer algorithm after a complete set of glances to a glance region. In this scenario, each row of data represents the entirety of the user's continuous time viewing a specific region until gaze is shifted to a different region. In this case, regions can be pre-specified based on coordinate boundaries output from an eye tracker or other device capable of providing the desired outputs. The detailed description with reference to FIG. 5 receives data at a regular interval, with a time step equal to approximately 0.1 seconds.

The input glance is classified as on-road or off-road at step 301 by evaluating whether the current glance region, as indicated by the glance region marker, is "on-road". Glances are classified to predetermine glance regions. For example, there may be four distinct glance regions, and thus the classification is to one of the four glance regions. In the provided example, the broader "on-road" category includes an "on-road center glance" and "on-road peripheral glance," while the "off-road" category includes an "off-road SA-relevant glance" and an "off-road non SA-relevant glance." A person skilled in the art, in view of the present disclosures, will recognize that fewer or more regions may be used, and any such regions can be identified in different manners, without departing from the spirit of the present disclosure. By way of example, classification of an on-road glance as centrally-located glance or peripherally-located glance may be based on a degree of eccentricity of the driver's glance from the forward road.

Each glance input can include a region marker associated with the specific input glance. Sequential input glances with identical region markers make up a glance region. Put otherwise, when consecutive glances exhibit the same region markers these distinct glances are threaded together to form the glance region. Glances regions may be identified at a high level of "on-road" and "off-road," or with more detail as "on-road center," "on-road peripheral," "off-road SA-relevant," and "off-road SA irrelevant," among other classifications provided for herein or otherwise derivable by a person skilled in the art in view of the present disclosures. When the algorithm queries a previous glance region, the buffer program looks to the prior, fully completed glance region, in contrast to the glance region marker associated with the immediately prior input glance. A current glance region is identified based on the current input glance marker. A glance marker can be determined from the video feed received by the cameras. By way of non-limiting examples, glance markers may be classified based on pre-defined regions set using an eye-tracker system, from video analyzed post-processing by human scoring, and/or by a learning algorithm trained to make glance region assessments based on a training database comprising manually-scored glances over time from a video. Generally, glance marker data can be obtained or derived from data collected from one or more glance-measuring devices, such as cameras and/or sensors. By way of non-limiting examples, sensors embedded or otherwise associated with the body (e.g., near or on the eye), which can be used to measure eyelid movements and/or eye or face muscle movements, and/or devices used to monitor brain waves and/or other neuro functions and pathways to determine information about the driver, such as where the driver is looking, for how long, how aware the driver is of outside objects, if the driver is paying attention to what he or she is looking at, etc. can be used in conjunction with obtaining glance marker data, including glance position, location, and duration, and other resource data allocation provided for in the present disclosure.

Off-Road Glances

When a glance is directed to an off-road region, the algorithm resets an information extraction latency counter, step 302, for reasons that will be described in detail with respect to On-Road Glances, below. Next, the program determines if the current glance region is to the "off-road SA-relevant" region at step 303. SA-relevant regions may include glances to the right or left side mirrors 290', the rearview mirror 258', right or left blind spots, a portion of an in-vehicle display on which information about at least one of vehicle performance, an automation state of the vehicle, a road and its conditions, environment data, surrounding data, and user data is displayed (e.g., the instrument cluster 246' and/or the IVI system 278'), or a location outside of the vehicle on which information about at least one of a road and its conditions, environment data, and surrounding data is displayed (e.g., the speed limit sign 292' or other driving-related signage located in view of the driver). A person skilled in the art will recognize a blind spot refers to an area around the vehicle that is obstructed from the driver's view under normal driving conditions. Spatial regions that qualify as SA-relevant can be calibrated per vehicle and/or per user, thus taking into account the various dynamics of a vehicle and/or a user's preferences with respect to how displays are organized and the type of information that is displayed to the user. Further, a person skilled in the art will understand that as vehicles become more automated, regions that qualify as SA-relevant may change. For example, in some instances of automated vehicles, glances to dynamically-updating in-vehicle displays may provide more SA-relevant information than a glance out of a front windshield might yield. The teachings in the present disclosure can be modified by a person skilled in the art to account for revised on-target, off-target, SA-relevant, and SA-irrelevant glances.

If the off-road glance is not directed to an SA-relevant region, indicating the glance is a situation awareness irrelevant glance, the algorithm moves on to step 304 and queries whether the attention buffer is at a minimum attention buffer value. The attention buffer can include a range of values and may be capped by a maximum attention buffer value and a minimum attention buffer value. The permissible attention buffer range may be conceptualized as an attention buffer depth, with an instantaneous attention buffer value demarcating how "full" or "empty" the attention buffer is currently. One skilled in the art will recognize that maximum and minimum buffers can be determined in a number of manners, for example, through on-road testing of the length of off-road glance times before a vehicle under manual control departs the lane. The minimum buffer value may be a fixed number or may be adjusted through adaptive learning by the system. By way of example, the minimum attention buffer value may be zero. In some embodiments, the minimum buffer may represent the point at which the vehicle is projected to leave the roadway or lane due to depleted awareness of the vehicle's position. If the attention buffer value is less than or equal to the minimum buffer value, the momentary buffer can be set to remain at the minimum buffer value, as shown at step 305. The momentary buffer can be stored as the most recent attention buffer, step 325, the momentary buffer and attention buffer statistics can be exported, step 326, and the program can receive the next set of data for input into the algorithm, step 327. As described above, storage and/or export of the derived momentary buffer can occur locally (e.g., in one or more memories associated with the resource allocation management system) and/or remotely (e.g., the cloud), and a person skilled in the art will recognize many techniques that can be used to store the desired data.

At step 304, when the minimum buffer is not reached, meaning the attention buffer is greater than the minimum buffer, the processor can calculate the momentary buffer value as the attention buffer less the real-time step multiplied by the SA decrement rate, as indicated at step 306. The momentary buffer can then be stored and exported, steps 325 and 326, and the next set of data received, step 327, as described earlier.

If, at step 303, the off-road glance is directed to an SA-relevant region, the processor can update the SA-relevant latency counter, which can be updated by adding the time step to the current SA-relevant latency counter, as shown at step 307. The SA-relevant latency counter represents the latency delay due to a situation relevant off-road glance, as discussed above. The delay can occur when the off-road glance is an SA-relevant glance, or a sequence of SA-relevant glances.

At step 308 the processor can query whether the SA-relevant latency is less than or equal to the SA-relevant latency threshold, which can be set to the desired SA-relevant latency delay. The SA-relevant latency threshold may be any value within the allowable range of attention buffer values. By way of example, the SA-relevant latency threshold may be approximately in the range of about 0.0 seconds to about 1.0 second. The optimal value of the SA-relevant latency threshold can be determined in a number of manners, for example, through on-road testing of the length of off-road glance time to a driving-related location while maintaining SA driving under manual control. If the SA-relevant latency is less than or equal to the SA-relevant latency threshold, the momentary buffer value can be set to the present attention buffer value, as shown at step 309. The momentary buffer can then be stored and exported, steps 325 and 326, and the next set of data received, step 327, as described earlier.

If the SA-relevant latency counter is greater than the SA-relevant latency threshold, as shown at step 308, the algorithm moves on to step 304 and queries whether the minimum attention buffer value is reached. If the attention buffer value is already minimum buffer value, the momentary buffer is set to remain at the minimum buffer value, as shown at step 305. When the attention buffer is not yet at the minimum buffer value, the processor calculates the momentary buffer value as the attention buffer minus the real-time step multiplied by the SA Decay rate, as shown at step 306. In either instances, after the determination is made, the previously discussed steps 325, 326, and 327 can be performed.

On-Road Glances

When the input glance is classified as an on-road glance, step 301, the SA-relevant latency counter can be reset to zero, as shown at step 310. Next, the system can determine whether the previous glance region was off-road, as shown at step 311. If the previous complete glance region was to an off-road region, either SA-relevant or non-SA-relevant, the system recognizes there has been a transition back to on-road, and thus accounts for a perception delay. The attention buffer algorithm takes into account a perception delay, also called an information extraction latency delay, for return of the glance from off-road to on-road to reflect the amount of time required by the driver to extract information from, and/or build a representation of, the on-road scene following from an off-road glance. Extracting information from the on-road scene may include perceiving the presence and relative location of elements that have meaning for maintaining safe travel and anticipating potential hazards. In this sense, the value of the information extraction latency delay is a function of either human or system processing capabilities.

When a transition glance occurs, the program can reset a center-on road region counter to zero, as shown at step 312. The center-on road region counter is described in greater detail below. At step 313, the processor can determine whether the information extraction latency counter is less than a predefined information extraction latency threshold. The information extraction latency threshold may be approximately in the range of about 0.0 seconds to about 1.0 second. The threshold range represents the minimum time required to extract information from the scene following a transition from an off-road glance to perceive a change in scene regarding the presence and relative location of elements that have meaning for maintaining safe travel and anticipating potential hazards. The information extraction latency threshold may be determined in a variety of manners, including, by way of non-limiting example, through basic vision science experiments on static and dynamic scene perception. If the information extraction latency counter is less than the threshold, the processor can update the information extraction latency counter by adding the real-time step to the counter, as shown at step 314. The momentary buffer value can then be set to the attention buffer value such that the attention buffer value remains unchanged, as shown at step 309. Previously discussed steps 325, 326, and 327 can then be performed.

If the processor determines at step 313 that the information extraction latency counter is greater than the threshold, the program can move to step 315. At step 315, the processor can use the input glance's region marker to identify whether the glance is to a center region of the road. If the glance region marker does not indicate a glance to the center region, meaning the glance is to a peripheral region of the road, the center on-road duration counter can be reset to zero, as shown at step 316, and the processor can check if the attention buffer value is the maximum buffer value, as shown at step 317. As mentioned above, the attention buffer can comprise a range of values and may be capped by a maximum attention buffer value and a minimum attention buffer value. The maximum buffer value may be the tolerance for maintaining a vehicle position in lane. The maximum attention buffer value may be a fixed value or may be set through an adaptive learning process. In some embodiments, the maximum buffer may be 2.0 for manual control. Under advanced automation, such as lane centering, some applications of the buffer may allow treatment of "situation awareness" for the team consisting of the human driver and the vehicle (or even two intelligent agents) such that the "combined" team buffer values go above the level for a single system (e.g., goes above the value of 2.0). If the attention buffer value is the maximum buffer value, the momentary buffer can remain unchanged and can be set to the maximum buffer value, as shown at step 318. Again, the previously discussed steps 325, 326, and 327 can be subsequently performed.

When the attention buffer value is less than the maximum buffer value, as shown at step 317, the processor can update the momentary buffer value by increasing the attention buffer value to reflect an increased operator SA due to the operator's on-road glance to a peripheral portion of the road, representing the driver scanning the roadway, as shown at step 319. The momentary buffer can be set to the attention buffer value, the initially-determined momentary value of the previous glance calculation cycle, plus a variable representing the increase in the operator's SA from the on-road glance, which can be calculated by multiplying the SA gain metric, SA Increment, by the real-time step. As shown and discussed earlier, then steps 325, 326, and 327 can be performed. As exemplified by the attention buffer algorithm, peripheral glances have a positive effect on the driver's situation awareness. Additionally, peripherally-located glances can provide for modeling the role of peripheral vision in other modeling contexts.

When the on-road glance is to the center region of the road, step 315, the processor can update a center on-road duration counter, as shown at step 320. The center on-road duration counter is a cumulative value that represents the total time the driver has continually kept his or her gaze on the center of the road—more generally referred to a same-located glance or gaze. At step 320, the center on-road duration counter can be increased by the real-time step. The center on-road duration counter can reset when the driver's glance transitions from off-road to on-road, step 312, or when the driver looks to a peripheral region of the road, step 316. The center on-road duration value can then be compared to a center on-road duration threshold, as shown at step 321, to determine the appropriate measure by which to adjust the attention value. The center-on road duration threshold can be a length of time that may indicate a driver's loss of attention or zoning out while continuously staring with a forward gaze on the center region of the road. For example, the center-on road duration threshold may be approximately in the range of about 6.0 seconds to about 30.0 seconds. One having ordinary skill in the art will recognize that a center on-road duration threshold may be determined in a variety of manners, including, for example, by basing the selection on simulator and/or on-road studies assessing the length and lateral eccentricity of glances to the roadway under cognitive load conditions, and their effects on driver perception, comprehension, and anticipation of potential hazards. If the center on-road duration is less than the center on-road duration threshold, the processor can move to step 317 and check whether the attention buffer has reached the maximum buffer. The flow logic is the same as described above with reference to the query at step 317 and subsequent steps.

If, at step 321, the center on-road duration counter is greater than or equal to the center on-road duration threshold, the value of the attention buffer can be compared to an on-road decrement floor, as shown at step 322. The on-road decrement floor reflects the optimal attention buffer value for maintaining sufficient awareness of the roadway to be responsive to potential hazards. By way of non-limiting example, the on-road decrement floor can be approximately in the range of about 0.0 seconds to about 2.0 seconds. An on-road decrement floor value may be selected in a number of manners known to those skilled in the art in view of the present disclosures, including basing it on simulator and/or on-road studies assessing the length and lateral eccentricity of glances to the roadway under cognitive load conditions, and their effects on driver perception, comprehension, and anticipation of potential hazards. If the attention buffer is greater than the on-road decrement floor, the processor can decrease the current attention buffer value to calculate the momentary buffer. Specifically, the momentary buffer value can be equal to the attention buffer less a center-on road decrement multiplied by the time step, as shown at step 323. This decrement in the attention buffer value can represent a decrease in SA as a result of the prolonged glance to the center of the road. The center on-road decrement reflects the amount of time a glance may be constrained to the road center before decrements to awareness of information located in the periphery and relevant for hazard detection is projected to occur. Determination of this rate takes into account cognitive load and driving conditions. By way of non-limiting example, the center on-road decrement rate can be approximately in the range of about 0.1 units per second to about 0.3 units per second. Similar to other variables of the attention buffer, simulator and/or on-road studies assessing the length and lateral eccentricity of glances to the roadway under cognitive load conditions, and their effects on driver perception, comprehension, and anticipation of potential hazards, can be used to calculate the center on-road decrement rate or range of acceptable rates. After calculation of the momentary buffer, the previously discussed steps 325, 326, and 327 can be performed.

If the attention buffer is not greater than the on-road decrement floor, step 322, the momentary buffer can be set to an on-road decrement floor, as shown at step 324. Again, the steps 325, 326, and 327 can be performed thereafter.

Benefits of the attention buffer are many. The attention buffer continuously assesses broad situational demands (e.g., taking driving environment into account), immediate task demands (e.g., considering a user's cognitive load in establishing threshold values such as center on-road duration), and a user's information processing state (e.g., glance duration and spatial region) in determining instantaneous changes in a measure of awareness of situation information. Unlike existing systems and methods that monitor a driver and focus almost exclusively on distractions that may exist (e.g., a text message being received), the attention buffer accounts for situations in which the driver is cognitively loaded. For example, a driver may be too focused on the road, or may appear to be too focused on the road because the gaze has not moved from the center of the road for an extended period of time when the driver has really zoned out. The attention buffer accounts for these possibilities and adjusts a measured awareness level accordingly. Further, the attention buffer also provides for more nuanced assessments of glance locations, recognizing that some types of glances that may otherwise be considered "off-target" are actually helpful glances in making the driver situation aware. This can include glances to check a blind spot, see other areas in and around the road and/or providing information about the vehicle itself (e.g., viewing the instrument cluster, the IVI system), etc. Still further, the attention buffer also accounts for perception delays, recognizing the trade-off that occurs as glances move from one location to another. Additionally, the attention buffer allows for other data and information beyond glances to factor into the overall attention or awareness level assessment of the operator. While the present attention buffer provides for a perception delay for a glance shift from off-road to on-road, a person skilled in the art, in view of the present disclosures, will understand that other perception delays when switching glances to a different task-related region (e.g., from on-road to an IVI system) can also be provided for in the context of the attention buffer, or other buffers derivable from the present disclosures.

Response to Momentary Buffer Values

The resource allocation management system (e.g., the system 103) of the present disclosure, when used in relation to the task of driving or otherwise operating a vehicle, is a positive management system which aids in and encourages safe operations beyond simply restricting certain functionality upon identification of a distracted driving state. Vehicle systems may take measures that are intended to increase the driver's knowledge and/or awareness of the situation in response to the attention buffer algorithm outputs. For example, a haptic alert, delivered through steering wheel vibration or seat vibration, may be sent in response to the momentary buffer dropping below a threshold or the attention buffer staying within a range over a predetermined time period. If the buffer data output indicates the attention buffer is steady at or around the on-road decrement floor value, instructions may be sent such that the steering wheel vibrates on the lateral portions cuing the driver to glance peripherally.

Alternatively or additionally, the vehicle may restrict potentially distracting information in an effort to return the driver's attention to the driving task. Certain types of notifications, such as text message alerts or push notifications from a connected phone, may be suppressed when the driver's momentary buffer or attention buffer falls below a predetermined value or range. Instructions may be sent to the instrument panel to augment displays by removing non-essential information when the momentary buffer is low or displaying alternative information, such as traffic or roadway conditions, to prompt an increase in SA. On the other hand, when a driver is highly attentive, the vehicle systems may suppress nuisance alarms, such as lane drift or blind spot alerts, that would add little value to the driver's current resource allocation.

Automation or "smart" systems within the vehicle may be augmented, adjusted, and/or controlled in a specific manner in response to the buffer data. These may include, but are not limited to, adaptive interfaces and context-aware vehicle control systems. A person skilled in the art, in view of the present disclosures, will recognize that adaptive interfaces can be configured to respond to change at least one of: one or more functions and content provided to the operator of the vehicle; one or more modalities in which content is provided to the operator; and a nature of one or more control inputs. Such changes can be effective to assist a driver in attending to an environment in a way that promotes situation awareness. Likewise, a person skilled in the art, in view of the present disclosures, will recognize that context-aware vehicle control systems can be configured to adjust parameters of a vehicle in response to at least one of a surrounding environment of the vehicle, knowledge, and the awareness level of driver.

In general, an automation system automates one or more actions and may selectively transition control between the vehicle and the driver. An automation state of the vehicle reflects the extent to which vehicle systems and control are performed in an automated manner, and is another of the many parameters that can be presented to the driver (e.g., via an in-vehicle display). For example, an automation system may transfer certain controls from the vehicle to the driver once the buffer data indicates a driver is sufficiently aware to take over those certain controls the driver was not previously adjudged to be aware of enough to handle. Likewise, an automation system may transfer certain controls from the driver to the vehicle without driver permission once the buffer data indicates a driver lacks proper awareness to handle particular tasks. In some cases, complete driving automation may occur until the driver's attention level increases. An automation system's decision to transition control back to the driver may be a function of the attention buffer. For example, if the buffer is below a certain threshold, the automation system may restrict transition where it would otherwise normally occur. As is known in the art, in an automated state the vehicle relies on sensor-based computer control to safely execute the driving task. In certain circumstances a geo-fence perimeter can be established in response to buffer data, cabining a driver to a specific operational area until attention level is increased. Vehicle systems may take additional countermeasures in response to a low or inadequate buffer value, such as pre-tensioning seat belts, pre-filling brakes, and/or preparing Crash Avoidance Systems.

In some instances, when the buffer algorithm exports momentary buffer values and related information to one or more databases, the data can be used to develop an operator specific profile. Such profiles can then be uploaded or downloaded for use with the system when the specific operator is using the vehicle. Thus, resource allocation profiles can change per-person (different people driving the same vehicle would have different profiles), per-vehicle (the same person driving a different vehicle may have a different profile because of differences that exist in different vehicles), and/or per-location (a driver's profile may change when the driver is familiar with a location and/or based on the type of road, such as highway vs. city driving).

Further, operator specific or vehicle specific profiles can be useful advantageously in many contexts beyond the act of driving. In view of the present disclosures, a fleet operations manager (e.g., delivery vehicles, transportation systems like buses or trains, etc.) can access attention buffer data for each operator or vehicle in the fleet. Using lifetime trends of the attention buffer, the fleet manager can award performance-based compensation and/or adjust work schedules or work areas tailored to specific operators based on dynamic performance data. Alternatively or additionally, fleet managers can use lifetime attention buffer data and/or monitor real time momentary buffer or attention buffer data and set or adjust geo-fenced locations if an operator's attention level drops below a given threshold for a certain amount of time.

Insurance companies may access operator specific profiles to tailor auto insurance credits for a specific customer. The operator specific profiles allow for a more refined and accurate estimation of risk associated with insuring the operator. One having ordinary skill in the art will understand the applicability of the attention buffer data extends to many situations that benefit from monitoring a user's level of attention, either instantaneously or over time, and as an individual or part of a larger population.

Use of Non-Glance Data in the Context of the Attention Buffer

The attention buffer illustrated in FIG. 5 primarily includes inputs related to glances. However, as illustrated by, and described with respect to, FIGS. 2-4, and as known by those skilled in the art, many resources are provided and/or are otherwise available for use by a resource allocation management system (e.g., the resource allocation management system 103). These resources come in the form of various sensors, cameras, etc., as explained in greater detail above. The data and other information provided by such resources, and any other resources available to the resource allocation management system (e.g., data or information provided by outside databases and the like), can be used by the resource allocation management system in a variety of ways.

In some instances, the data and information generated from sensors, cameras, surrounding vehicles that are interconnected via vehicle-to-vehicle communication systems (e.g., the system 209), databases, and the like can be used to modify thresholds associated with glance data in conjunction with the attention buffer, such as maximum buffer value, minimum buffer value, and/or on-road decrement floor, by way of non-limiting examples. Such thresholds can be a function of many different types of data and information, such as environmental factors, contextual data, and other types of data and information provided for herein or otherwise known to those skilled in the art. One example of an instance in which a threshold is adjusted in response to environmental factors was provided above with respect to adjustments made to a glance threshold when normal road conditions change to icy road conditions. More particularly, the buffer can be adjusted such that when icy road conditions exist, the threshold rises, thus accounting for the recognition that more awareness is typically required when the road conditions are more dangerous.

Driver biometrics may be used to establish a baseline level of information retention or recall, which in turn can influence buffer variables such as increment or decrement rates, and the information extraction latency threshold. This may include a frequency with which the driver operates in the vehicle's location resulting in an increased latent familiarity with the surroundings and potential hazards. The vehicle's speed may be used to adjust the SA decrement rate as the speed influences the amount of time a driver may safely look away from the road. By way of further non-limiting examples, data such as traffic congestion data, driver resource allocation data, and/or level of automation may be incorporated by the attention buffer algorithm in setting various thresholds. For instance, if the surrounding cars are operating in a highly automated state, the attention buffer algorithm may increase the SA increment rate. If the surrounding cars are driven with a high level of automation they will take into account action of the user's vehicle, thus the time required for the user to maintain an on-road glance to fully perceive and comprehend the presence of hazards resulting from other drivers is reduced, resulting in an increased SA increment rate. Additionally, road conditions, weather conditions, location data, and/or surrounding vehicle information may factor in to the calculation of the various increment or decrement rates and thresholds. A person skilled in the art will recognize many other ways by which data and information provided to the resource allocation management system can be used to modify thresholds and values used with respect to glance data.

In other instances, the data and information generated from sensors, cameras, surrounding vehicles that are interconnected via vehicle-to-vehicle communication systems (e.g., the system 209), databases, and the like can be used to provide additional steps in the attention buffer algorithm. Various thresholds can be established with respect to this additional data and information, and those thresholds can provide for additional steps that act in a manner similar to those described for glance data. For example, in addition to calculating a momentary buffer value, prior to calculating the next momentary buffer value, additional data or information (e.g., the heart rate of the operator) can be added, analyzed against an established threshold heart rate, and stored and exported in a manner similar to the momentary buffer value. Responses or other outputs (e.g., augmentation of systems, information, etc., as provided for herein) can be triggered then based on the combination of the momentary buffer value and the heart rate.

In still other instances, the data and information generated from sensors, cameras, databases, and the like can be used in lieu of glance data in the attention buffer algorithm. Treading on the above-referenced discussion of heart rate, the resource allocation management system can run the attention buffer of FIG. 5 with the thresholds and values related to heart rate replacing the glance-based steps. By way of non-limiting example, rather than having a portion of the buffer related to "on-road glances" and a portion related to "off-road glances," the buffer could be divided into situations where a heart rate exceeds a certain threshold (e.g., 120 beats per minute), and then, based on that information, outputs of the nature provided for herein can result (e.g., providing data, augmenting information or responses, etc.). Another non-limiting example includes a situation in which the vehicle contains a passive alcohol sensor and the driver is detected to be alcohol-impaired. Such information can be used to adjust the functioning of the attention buffer (e.g., adjust the thresholds and/or parameters of the attention buffer) and/or adapt the interface for countermeasures appropriate to alcohol-impairment issues. By way of a further non-limiting example, if the vehicle has the ability to collect data about a state of drowsiness or sleepiness (e.g., blink data, head nodding, other biometrically-relevant data), the system can react to information indicative of drowsiness and/or sleepiness to adjust the functioning of the attention buffer (e.g., adjust the thresholds and/or parameters of the attention buffer) and/or adapt the interface for countermeasures appropriate to drowsy driving. By way of one further non-limiting example, in situations in which biometric data, such as heart rate or galvanic skin response, can be inputted into the system to help detect an anxiety level of a driver, the system can take actions in response to that information, such as asking if the driver would like more support for route following, asking the driver if he or she would like to change to a route with less traffic, and/or asking the driver if quiet music and/or cooler air would be helpful, among other responses, including automated changes that occur without first making requests to the driver.

The types of data and information that can be obtained for use with the attention buffer disclosures provided for herein include the kinematics of a vehicle (e.g., alignment, type of brakes, weight distribution, etc.), the kinematics of the operator (e.g., eye movements, head movements, driver state, other types of movements provided for herein or otherwise known to those skilled in the art, etc.), determinations of the type of activity being performed by the operator of the vehicle (e.g., accelerating, braking, changing lanes, etc.), one or more environmental factors (e.g., weather, road conditions, etc.), one or more biometric parameters of the operator of the vehicle (e.g., heart rate, drowsiness, etc.), and one or more performance parameters of the operator of the vehicle (e.g., defensive driver, aggressive driver, more familiar with driving on a particular type of road and/or in a particular lane, etc.). A person skilled in the art will recognize many different types of data and information that can be used in this context, and how this data and information can be obtained, including, but not limited to, using some of the sensors, cameras, etc. provided for in FIGS. 2-4, as well as remoted databases and the like.

Computer Implementation

Figure 6:
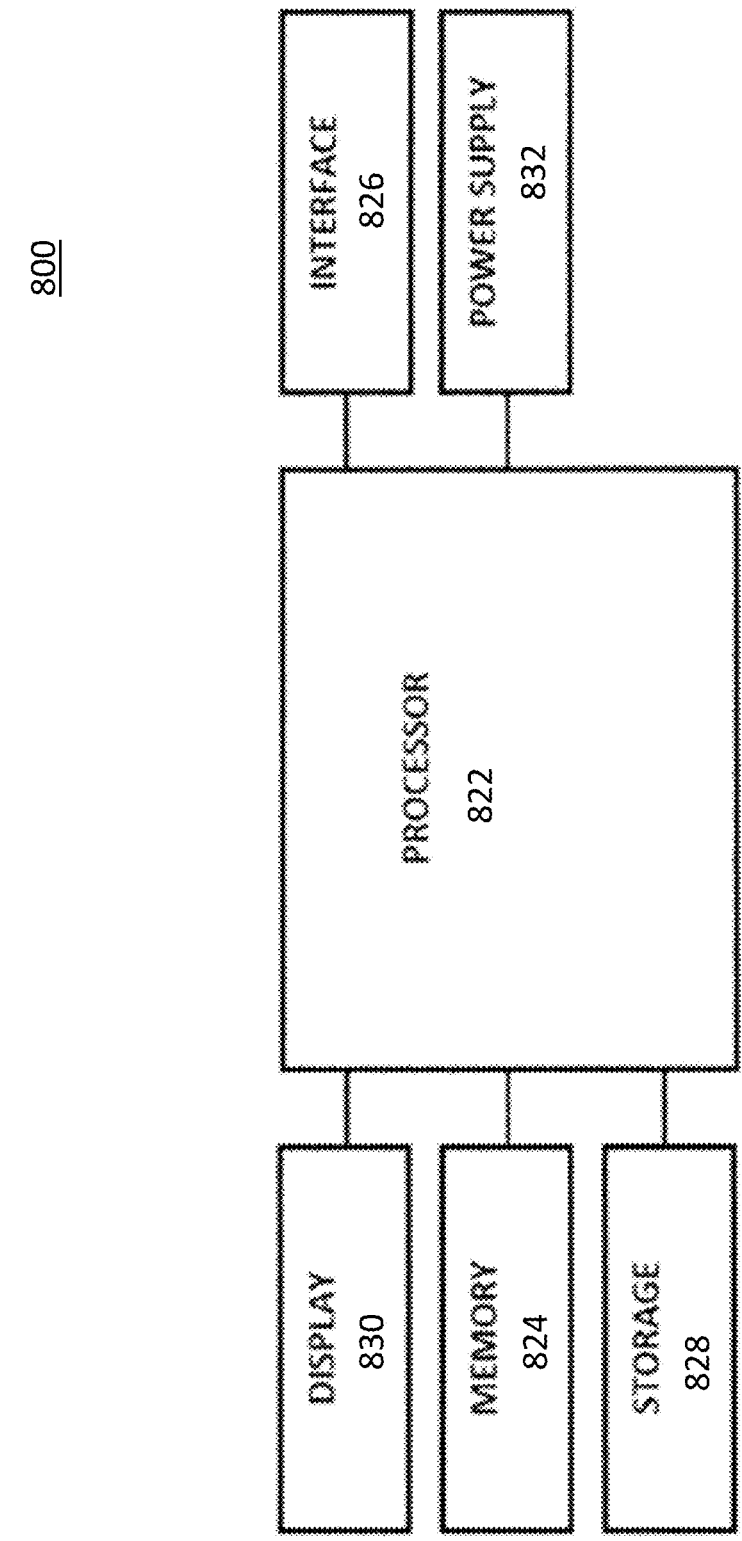
FIG. 6 is a schematic block diagram of one exemplary embodiment of a computer system for performing the attention buffer algorithm of FIG. 5, among other disclosures and features provided for herein.

FIG. 6 illustrates a block diagram of the physical components of an exemplary embodiment of the controller, or computer, 800 that can include an a resource allocation management system 103 and/or execute the attention buffer described herein (e.g., FIG. 5). Although an exemplary computer 800 is depicted and described herein, it will be appreciated that this is for sake of generality and convenience. In other embodiments, the computer 800 may differ in architecture and operation from that shown and described here. The computer 800 can be a tablet computer, mobile device, smart device, wearable device, smart phone, laptop computer, desktop computer, cloud-based computer, server computer, multiple of the above, and so forth.

The illustrated computer 800 can include a processor 822 that controls the operation of the computer, for example, by executing embedded software, operating systems, device drivers, application programs, and so forth. The processor 822 can include any type of microprocessor or central processing unit (CPU), including programmable general-purpose or special-purpose processors and/or any of a variety of proprietary or commercially-available single or multi-processor systems. As used herein, the term processor can refer to microprocessors, microcontrollers, ASICs, FPGAs, PICs, processors that read and interpret program instructions from internal or external memory or registers, and so forth. The computer 800 can include a memory 824, which can provide temporary or permanent storage for code to be executed by the processor 822 or for data that is processed by the processor. The memory 824 can include read-only memory (ROM), flash memory, one or more varieties of random access memory (RAM), and/or a combination of memory technologies. The various components of the computer 800 can be interconnected via any one or more separate traces, physical busses, communication lines, etc.

The computer 800 can include an interface 826, such as a communication interface or an I/O interface. A communication interface can enable the computer 800 to communicate with remote devices (e.g., other controllers or computer systems) over a network or communications bus (e.g., a universal serial bus). An I/O interface can facilitate communication between one or more input devices, one or more output devices, and the various other components of the computer 800. For example, the interface 826 can communicate with the computer components of a second computer (e.g., an integrated radio of the second computer). Exemplary input devices include touch screens, mechanical buttons, keyboards, and pointing devices. Additional exemplary output devices include a projector, electronic display screens, and speakers. The computer 800 can include a storage device 828, which can include any conventional medium for storing data in a non-volatile and/or non-transient manner. The storage device 828 can thus hold data and/or instructions in a persistent state (i.e., the value is retained despite interruption of power to the computer 800). The storage device 828 can include one or more hard disk drives, flash drives, USB drives, optical drives, various media disks or cards, and/or any combination thereof and can be directly connected to the other components of the computer 800 or remotely connected thereto, such as through the communication interface. The computer 800 can include a display 830, and can generate images to be displayed thereon. In some embodiments, the display 830 can be a vacuum fluorescent display (VFD), an organic light-emitting diode (OLED) display, or a liquid crystal display (LCD). The computer 800 can include a power supply 832 and appropriate regulating and conditioning circuitry. Exemplary power supplies include batteries, such as polymer lithium ion batteries, or adapters for coupling the computer 800 to a DC or AC power source (e.g., a USB adapter or a wall adapter).

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method for real-time assessment of resource allocation by a resource allocation management system that includes one or more processors, the method comprising:
   the one or more processors receiving information in real-time about a plurality of glances of a user, the plurality of glances occurring over a period of time;
   the one or more processors classifying each of the plurality of glances as an on-target glance or an off-target glance;
   the one or more processors calculating on a continuous basis a moment-to-moment buffer value of an attention buffer based on the classified glances of the plurality of glances, the attention buffer being a range of values corresponding to an awareness level of the user;
   the one or more processors continuously outputting the calculated moment-to-moment buffer value such that the calculated moment-to-moment buffer value is known at any moment of time during performance of the method; and
   at least one of:
      the resource allocation management system providing instructions based on the continuously outputted calculated moment-to-moment buffer value; and
      the resource allocation management system providing data to one or more databases, the data including at least some continuously outputted calculated moment-to-moment buffer values of the continuously outputted calculated moment-to-moment buffer values over a period of time.

2. The method of claim 1,
   wherein the user is an operator of a vehicle,
   wherein the method comprises the resource allocation management system providing instructions based on the continuously outputted calculated moment-to-moment buffer value, and
   wherein providing instructions based on the continuously outputted calculated moment-to-moment buffer value further comprises providing instructions to at least one of the vehicle, the operator of the vehicle, and a receiver configured to receive the instructions, the instructions being based on the continuously outputted calculated moment-to-moment buffer value.

3. The method of claim 2, further comprises the resource allocation management system communicating with one or more components of the vehicle to at least one of continuously output the calculated moment-to-moment buffer value and provide instructions to at least one of the vehicle, the operator of the vehicle, and a receiver configured to receive the instructions based on the continuously outputted calculated moment-to-moment buffer value, the one or more components of the vehicle comprising:
   an automation system configured to automate one or more actions associated with the vehicle;
   an adaptive interface configured to respond to change at least one of: one or more functions and content provided to the operator of the vehicle; one or more modalities in which content is provided to the operator; and a nature of one or more control inputs, to effectively assist the operator of the vehicle in attending to an environment in a way that promotes situation awareness;
   a context-aware vehicle control system configured to adjust parameters of the vehicle in response to at least one of a surrounding environment of the vehicle, knowledge, and the awareness level of the operator of the vehicle; and
   in-vehicle displays configured to provide to the operator of the vehicle at least one of information about the vehicle and control of aspects of the vehicle.

4. The method of claim 2, further comprising the resource allocation management system adapting the instructions provided to at least one of the vehicle, the operator of the vehicle, and the receiver configured to receive the instructions based on at least one of changes made by the operator of the vehicle during operation of the vehicle and changes to an environment surrounding the vehicle.

5. The method of claim 1,
wherein the method comprises the resource allocation management system providing instructions based on the continuously outputted calculated moment-to-moment buffer value, and
wherein providing instructions based on the continuously outputted calculated moment-to-moment buffer value further comprises at least one of:
(1) the resource allocation management system providing instructions configured to alter the awareness level of the user;
(2) the resource allocation management system providing instructions to an automated system to adjust one or more parameters thereof in response to the continuously outputted calculated moment-to-moment buffer value; and
(3) the resource allocation management system providing instructions to augment an exchange of information with the user.

6. The method of claim 5, wherein providing instructions to augment an exchange of information with the user further comprises the resource allocation management system providing instructions to suppress an exchange of information with the user.

7. The method of claim 1, wherein the information received by the one or more processors in real-time about a plurality of glances further comprises frequency, duration, and location.

8. The method of claim 1, wherein the one or more processors calculating on a continuous basis a moment-to-moment buffer value of an attention buffer based on the classified glances from the plurality of glances further comprises threading together the classified on-target glances and the classified off-target glances over a period of time, the classified on-target glances and the classified off-target glances comprising a duration for each such classified on-target and off-target glance.

9. The method of claim 1, wherein the one or more processors classifying each of the plurality of glances as an on-target glance or an off-target glance further comprises:
classifying each of the on-target glances as being a centrally-located glance or a peripherally-located glance; and
classifying each of the off-target glances as being a situation awareness relevant glance or a situation awareness irrelevant glance.

10. The method of claim 9,
wherein the user is an operator of a vehicle, and
wherein the situation awareness relevant glance comprises a glance in one of the following locations: a rear view mirror, a side view mirror, a blind spot, a portion of an in-vehicle display on which information about at least one of vehicle performance, an automation state of the vehicle, a road and its conditions, environment data, surrounding data, and user data is displayed, and a location outside of the vehicle on which information about at least one of a road and its conditions, environment data, and surrounding data is displayed.

11. The method of claim 9,
wherein when the off-target glance is a situation awareness relevant glance, or a sequence of situation awareness relevant glances, the one or more processors calculating on a continuous basis a moment-to-moment buffer value of an attention buffer further comprises delaying application of a decrement rate of the attention buffer until after a delay period has expired and the situation awareness relevant glance is still the current classified glance.

12. The method of claim 9,
wherein when the on-target glance is a centrally-located glance, the one or more processors calculating on a continuous basis a moment-to-moment buffer value of an attention buffer further comprises applying a decrement rate of the attention buffer when a time for which the centrally-located glance occurs exceeds a threshold value.

13. The method of claim 1, further comprising:
the one or more processors comparing the continuously outputted calculated moment-to-moment buffer value to a threshold value,
wherein the method comprises the resource allocation management system providing instructions based on the continuously outputted calculated moment-to-moment buffer value, and wherein the provided instructions are selected based on the comparison of the calculated moment-to-moment buffer value and the threshold value.

14. The method of claim 13, further comprising the one or ore processors adjusting the threshold value in view of at least one of vehicle performance, an automation state of the vehicle, a road and its conditions, environment data, surrounding data, and user data.

15. The method of claim 1, wherein the attention buffer comprises an equation having a plurality of variables that impact the moment-to-moment buffer value, the plurality of variables being configured to cause a rate between moment-to-moment buffer values to increase or decrease at a variable rate.

16. The method of claim 1,
wherein the attention buffer comprises an equation having a plurality of variables that impact the moment-to-moment buffer value, the plurality of variables including at least one of:
(1) increment rate;
(2) decrement rate;
(3) initial value start;
(4) switching cost;
(5) existence of a glance rate decrement; and
(6) a location-based latency, and
the method further comprising the one or more processors selecting one or more variables of the plurality of variables to rely upon to perform the calculating of the moment-to-moment buffer value based on at least one of the following factors:
(1) broad situational demands;
(2) immediate task demands; and
(3) an information processing state.

17. The method of claim 16, wherein the equation of the attention buffer accounts for a duration of the on-target glances and a duration of the off-target glances.

18. The method of claim 16, wherein the equation of the attention buffer accounts for glance transitions.

19. The method of claim 1,
wherein the user is an operator of a vehicle,
wherein the method comprises the one or more processors providing data to one or more databases, the data including at least some continuously outputted calculated moment-to-moment buffer values of the continuously outputted calculated moment-to-moment buffer values over a period of time, and wherein the provided data is configured for use to define an operator profile based on the received moment-to-moment buffer values.

20. The method of claim 1,
wherein the user is an operator of a vehicle,
wherein the method comprises the one or more processors providing data to one or more databases, the data including at least some continuously outputted calculated moment-to-moment buffer values of the continuously outputted calculated moment-to-moment buffer values over a period of time, and
wherein the provided data is configured for use to define a global profile based on at least one of a mean, mode, variability, moving average window, standard deviation, distribution summary, moment-to-moment aggregate plot, advanced metrics involving Fourier analysis of spectral width and power, and Symbolic Aggregate Approximation, that is calculated from at least some portion of the received moment-to-moment buffer values.

21. The method of claim 1, further comprising:
the one or more processors operating an artificial intelligence component to adjust the attention buffer based on learned information about at least one of the user and an environment impacting the user.

22. The method of claim 1,
wherein the user is an operator of a vehicle,
wherein the method comprises the one or more processors providing data to one or more databases, the data including at least some continuously outputted calculated moment-to-moment buffer values of the continuously outputted calculated moment-to-moment buffer values over a period of time, and
wherein the provided data includes information relevant for determining at least one of insurance credits and insurance rates.

23. A method for allocating resources by a resource allocation management system that includes one or more processors, the method comprising:
the one or more processors classifying a glance as an on-target glance or an off-target glance for use in quantifying a momentary buffer value;
if the glance is classified as an on-target glance, the method further comprising:
the one or more processors determining if an immediately preceding glance was an on-target glance or an off-target glance;
the one or more processors determining a momentary buffer value for the glance,
wherein, if the immediately preceding glance was an off-target glance, the resource allocation management system accounting for a transition associated with moving from the off-target glance to the on-target glance, and
if the glance is classified as an off-target glance, the method further comprising:
the one or more processors classifying the off-target glance as being a situation awareness relevant glance or a situation awareness irrelevant glance; and
the one or more processors determining a momentary buffer value for the glance,
wherein, if the off-target glance is a situation awareness relevance glance, determining a momentary buffer value for the glance further comprises the resource allocation management system accounting for a latency.

24. The method of claim 23, wherein if the glance is an on-target glance, the method further comprises:
the one or more processors classifying the on-target glance as being a centrally-located glance or a peripherally-located glance,
wherein, if the on-target glance is a centrally-located glance, the one or more processors determining a momentary buffer value for the glance further comprises the one or more processors accounting for an instance in which a duration of time for consecutive centrally-located glances exceeds a threshold time, and
wherein, if the on-target glance is a peripherally-located glance, the one or more processors determining a momentary buffer value for the glance further comprises the one or more processors determining the momentary buffer value for the glance based on at least one of an initially-determined momentary buffer value, a maximum buffer value, and an increment value associated with the on-target glance.

25. The method of claim 24, wherein, if the on-target glance is a centrally-located glance, the one or more processors determining a momentary buffer value for the glance further comprises:
(1) the one or more processors determining the duration of time for consecutive centrally-located glances;
(2) the one or more processors comparing the duration of time for the consecutive centrally-located glances to the threshold time;
(3) if the duration of time for the consecutive centrally-located glances is equal to or greater than the threshold time:
(a) the one or more processors comparing an initially-determined momentary buffer value to an on-target buffer decrement floor value;
(b) if the initially-determined momentary buffer value is greater than the on-target buffer decrement floor value, the one or more processors determining a momentary buffer value for the glance further comprises the one or more processors setting the momentary buffer value as the initially-determined momentary buffer value less a decrement value associated with the on-target glance; and
(c) if the initially-determined momentary buffer value is less than or equal to the on-target buffer decrement floor value, the one or more processors determining a momentary buffer value for the glance further comprises the one or more processors setting the momentary buffer value as the on-target buffer decrement floor value; and
(4) if the duration of time for the consecutive centrally-located glances is less than the threshold time, the one or more processors determining the momentary buffer value for the glance further comprises the one or more processors determining the momentary buffer value for the glance based on at least one of the initially-determined momentary buffer value, the maximum buffer value, and the increment value associated with the on-target glance.

26. The method of claim 23, wherein if the glance is an off-target glance, the one or more processors determining a momentary buffer value for the glance is based on at least one of an initially-determined momentary buffer value, a minimum buffer value, and a decrement value associated with the off-target glance.

27. The method of claim 26, wherein the one or more processors determining a momentary buffer value for the glance when the off-target glance is classified as a situation awareness relevant glance further comprises:
(1) the one or more processors determining a latency value associated with the momentary buffer value;
(2) the one or more processors comparing the determined latency value with a threshold latency value;
(3) if the determined latency value is less than or equal to the threshold latency value, the one or more processors determining a momentary buffer value for the glance further comprises the one or more processors setting the momentary buffer value as the initially-determined momentary buffer value; and
(4) if the determined latency value is greater than the threshold latency value:
  (a) the one or more processors comparing the initially-determined momentary buffer value to the minimum buffer value;
  (b) if the initially-determined momentary buffer value is less than or equal to the minimum buffer value, the one or more processors determining a momentary buffer value for the glance further comprises the one or more processors setting the momentary buffer value as the minimum buffer value; and
  (c) if the initially-determined momentary buffer value is greater than the minimum buffer value, the one or more processors determining a momentary buffer value for the glance further comprises the one or more processors setting the momentary buffer value as the initially-determined momentary buffer value less the decrement value associated with the off-target glance.

28. The method of claim 26, wherein the one or more processors determining a momentary buffer value for the glance when the off-target glance is classified as a situation awareness irrelevant glance further comprises:
the one or more processors comparing the initially-determined momentary buffer value to the minimum buffer value;
if the initially-determined momentary buffer value is less than or equal to the minimum buffer value, the one or more processors determining a momentary buffer value for the glance further comprises the one or more processors setting the momentary buffer value as the minimum buffer value; and
if the initially-determined momentary buffer value is greater than the minimum buffer value, the one or more processors determining a momentary buffer value for the glance further comprises the one or more processors setting the momentary buffer value as the initially-determined momentary buffer value less the decrement value associated with the off-target glance.

29. The method of claim 23, wherein the one or more processors accounting for a transition associated with moving from the off-target glance to the on-target glance further comprises: the one or more processors determining an information extraction latency value for the on-target glance;
the one or more processors comparing the information extraction latency value to a threshold information extraction latency value;
if the information extraction latency value is less than the threshold information extraction latency value, the one or more processors determining a momentary buffer value for the glance further comprises setting the momentary buffer value as the initially-determined momentary buffer value; and
if the information extraction latency value is greater than or equal to the threshold information extraction latency value, the method further comprises the one or more processors classifying the on-target glance as being a centrally-located glance or a peripherally-located glance,
wherein, if the on-target glance is a centrally-located glance, the one or more processors determining a momentary buffer value for the glance further comprises the one or more processors accounting for an instance in which a duration of time for consecutive centrally-located glances exceeds a threshold time, and
wherein, if the on-target glance is a peripherally-located glance, the one or more processors determining a momentary buffer value for the glance further comprises the one or more processors determining the momentary buffer value for the glance based on at least one of an initially-determined momentary buffer value, a maximum buffer value, and an increment value associated with the on-target glance.

30. The method of claim 23, further comprising:
the one or more processors storing the determined momentary buffer value;
the one or more processors exporting the determined momentary buffer value; and
repeating the steps of claim 23, to determine one or more subsequent momentary buffer values.

31. The method of claim 23, further comprising the one or more processors adjusting one or more threshold values used in conjunction with determining a momentary buffer value for the glance.

32. The method of claim 31, wherein the one or more threshold values comprises at least one of: a threshold time associated with a duration of time for consecutive same-located glances; a threshold latency value associated with one or more momentary buffer values; and a threshold information extraction latency value associated with the glance.

33. The method of claim 23, wherein the glance that is classified is a glance that is performed while operating a vehicle.

34. The method of claim 33, further comprising:
the one or more processors providing the determined momentary buffer value to one or more databases configured to define an operator profile;
repeating the steps of claim 23 to determine one or more subsequent momentary buffer values; and
the one or more processors providing the determined one or more subsequent momentary buffer values to the one or more databases configured to define an operator profile, the operator profile being defined based on the provided determined momentary buffer value and the determined one or more subsequent momentary buffer values.

35. The method of claim 33, further comprising:
the one or more processors providing the determined momentary buffer value to one or more databases configured to define a global profile;
repeating the steps of claim 23 to determine one or more subsequent momentary buffer values; and
the one or more processors providing the determined one or more subsequent momentary buffer values to the one or more databases configured to define a global profile, the global profile being defined based on at least one of a mean, mode, variability, moving average window, standard deviation, distribution summary, moment-to-moment aggregate plot, advanced metrics involving Fourier analysis of spectral width and power, and Symbolic Aggregate Approximation, that is calculated from at least some portion of the determined momentary buffer value and the one or more subsequent momentary buffer values.

36. The method of claim 33, further comprising the one or more processors providing the determined momentary buffer value to one or more databases configured to be used for determining at least one of insurance credits and insurance rates.

37. The method of claim 23, further comprising:
the one or more processors operating an artificial intelligence component to adjust one or more threshold values used in conjunction with determining a momentary buffer value for the glance.

38. The method of claim 37, wherein adjustment of the one or more threshold values is based on learned information about at least one of a user and an environment impacting the user.

* * * * *